United States Patent
Celozzi et al.

(10) Patent No.: US 10,999,147 B2
(45) Date of Patent: May 4, 2021

(54) ALLOCATING VNFC INSTANCES WITH ANTI AFFINITY RULE TO HOSTS

(71) Applicant: Telefonaktiebolaget LM Ericsson (publ), Stockholm (SE)

(72) Inventors: Giuseppe Celozzi, Pagani (IT); Luca Baldini, Pagani (IT); Daniele Gaito, Pagani (IT); Gaetano Patria, Pagani (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 117 days.

(21) Appl. No.: 16/318,184

(22) PCT Filed: Jul. 18, 2016

(86) PCT No.: PCT/EP2016/067052
§ 371 (c)(1),
(2) Date: Jan. 16, 2019

(87) PCT Pub. No.: WO2018/014933
PCT Pub. Date: Jan. 25, 2018

(65) Prior Publication Data
US 2019/0288914 A1 Sep. 19, 2019

(51) Int. Cl.
*H04L 12/24* (2006.01)
*G06F 9/455* (2018.01)
*G06F 9/50* (2006.01)

(52) U.S. Cl.
CPC ...... *H04L 41/0896* (2013.01); *G06F 9/45558* (2013.01); *G06F 9/5077* (2013.01);
(Continued)

(58) Field of Classification Search
CPC ............. H04L 41/0896; H04L 41/0816; H04L 41/0893; H04L 43/0817; G06F 9/45558;
(Continued)

(56) References Cited

U.S. PATENT DOCUMENTS

2013/0326053 A1* 12/2013 Bauer .................. G06F 11/20
709/224
2015/0040127 A1   2/2015 Dippenaar et al.
(Continued)

FOREIGN PATENT DOCUMENTS

| WO | 2015 126430 A1 | 8/2015 |
| WO | 2016 048430 A1 | 3/2016 |
| WO | 2017 067616 A1 | 4/2017 |

OTHER PUBLICATIONS

AAGA: Affinity-Aware Grouping for Allocation of Virtual Machines, 2013 IEEE 27th International Conference on Advanced Information Networking and Applications by Jianhai Chen et al.—2013.
(Continued)

*Primary Examiner* — Tan Doan
(74) *Attorney, Agent, or Firm* — Baker Botts, LLP

(57) ABSTRACT

A method (200) of managing a communications network comprising a plurality of hosts by allocating instances of virtual network function components, VNFC, to hosts, the method comprising receiving (210) a request for allocation of an instance of a VNFC to a host, the instance belonging to an anti-affinity group, AAG, of instances and attempting allocation (220) of the instance to a host. If allocation of the instance fails (230) because for each host considered for allocation of the instance a first number of instances, WA, belonging to the AAG that are allocable to a single host would be exceeded by allocation of the instance to the host the method comprises assigning (232) to the instance a second number of instances, WA', belonging to the AAG that are allocable to a single host, wherein WA' is greater than WA and reattempting allocation (234) of the instance. Following successful allocation, if sufficient capacity for the instance subsequently becomes available on another host and if the WA of the instance would not be exceeded by allocation of the instance to the other host, migrating (236)
(Continued)

the instance to the other host; or following unsuccessful allocation, if there is sufficient capacity for the instance available on at least one host, increasing WA' of the instance and recommencing by reattempting allocation (238).

17 Claims, 18 Drawing Sheets

(52) U.S. Cl.
CPC ...... *H04L 41/0816* (2013.01); *H04L 41/0893* (2013.01); *G06F 2009/45595* (2013.01)

(58) Field of Classification Search
CPC ......... G06F 9/5077; G06F 2009/45595; G06F 2009/45562; G06F 2009/4557; G06F 11/20
USPC .......................................................... 709/226
See application file for complete search history.

(56) References Cited

U.S. PATENT DOCUMENTS

| | | |
|---|---|---|
| 2016/0057102 A1 | 2/2016 | Wei et al. |
| 2016/0381125 A1* | 12/2016 | Jagadeeshwaran .......................... H04L 67/1008 709/223 |
| 2017/0068555 A1* | 3/2017 | Cropper .................. H04L 67/10 |
| 2017/0374136 A1* | 12/2017 | Ringdahl ............ G06F 9/45558 |

OTHER PUBLICATIONS

ETSI GS NFV-MAN 001 v1.1.1; Group Specification; Network Functions Virtualisation (NFV); Management and Orchestration—Dec. 2014.
Security for the Cloud Infrastructure: Trusted Virtual Data Center Implementation by S. Berger et al.; IBM J. Res. & Dev., vol. 53, No. 4, Paper 6—2009.
International Search Report for International application No. PCT/EP2016/067052—dated Apr. 5, 2017.

* cited by examiner

ALLOCATING VNFC INSTANCES WITH ANTI AFFINITY RULE TO HOSTS

PRIORITY

This nonprovisional application is a U.S. National Stage Filing under 35 U.S.C. § 371 of International Patent Application Serial No. PCT/EP2016/067052 filed Jul. 18, 2016, and entitled "Allocating VNFC Instances With Anti Affinity Rule To Hosts" which is hereby incorporated by reference in its entirety.

TECHNICAL FIELD

The invention relates to a method of managing a communications network comprising a plurality of hosts by allocating instances of virtual network function components to hosts and to communications network management apparatus.

BACKGROUND

It is known to apply virtualization to network functions in communications networks. Benefits of such network function virtualization NFV derive partly from replacing silos of monolithic and proprietary, and therefore expensive, hardware service platforms in the communications infrastructure by abstracted services run as applications on an open and commodity, and therefore cheaper, compute, storage and network infrastructure. An example architectural framework is under development within the European Telecommunications Standards Institute, ETSI, known as NFV, and some features of this are summarized below with respect to FIG. 10.

Telecoms networks currently contain a variety, which is tending to increase, of proprietary hardware appliances. Each network service may use a separate hardware appliance. Hardware lifecycles are becoming shorter, reducing the return on investment of deploying new services in an increasingly network-centric world. NFV is a new network operator-led Industry Specification Group, ISG, in ETSI to work through the technical challenges for Network Functions Virtualization. Network Functions Virtualization, NFV, aims to address these problems by evolving standard IT virtualization technology to consolidate many network equipment types onto industry standard high volume servers, switches and storage.

NFV involves implementing network functions in software that can run on a range of industry standard server hardware, and that can be moved to, or instantiated in, various locations in the network as required, without the need to install new equipment. NFV decouples software implementations of Network Functions from the compute, storage, and networking resources through a virtualization layer.

In addition to traditional Fault, Configuration, Accounting, Performance, and Security, FCAPS, Management, the NFV Management and Orchestration framework, MANO, introduces a new set of management functions associated with the lifecycle management of a VNF. The NFV ISG has focused on detailing these new sets of management functions, which include, but are not limited to: on-board a VNF, instantiate a VNF, scale a VNF, update a VNF, and terminate a VNF. Notably in fault and performance management in a virtualized environment, different functional blocks at different layers are involved. As a result more coordination may be needed between the infrastructure and the VNF instantiated depending on their peculiar characteristics.

Complex network functions, when virtualized can be mapped to a more than one virtual machine. On processing hardware such as a server, more than one component of a VNF can run in each separate virtual machine and many virtual machines can run on a server. The servers may be located inside a cloud data centre.

Where it is desirable to provide some redundancy to protect against faults, hardware and/or software, it is known to specify an anti-affinity, AA, rule. In Virtual/Cloud environments AA rules prevent more than one VNFCI from the same group of instances, such as N+M instances of a single VNFC where N is the minimum number of instances required, and M is the number of additional instances to provide redundancy, being loaded and running on the same host. This can prevent a single hardware/Hypervisor fault from causing loss of multiple instances at once. So in this case there are N+M instances each allocated to a different physical host.

SUMMARY

It is an object to provide an improved method of managing a communications network comprising a plurality of hosts. It is a further object to provide an improved communications network management apparatus.

An aspect of the invention provides a method of managing a communications network comprising a plurality of hosts by allocating instances of virtual network function components to hosts. The method comprises receiving a request for allocation of an instance of a virtual network function component, VNFC, to a host, the instance belonging to an anti-affinity group, AAG, of instances. The method comprises attempting allocation of the instance to a host and then, if allocation of the instance fails because for each host considered for allocation of the instance a first number of instances, WA, belonging to the AAG that are allocable to a single host would be exceeded by allocation of the instance to the host, the method comprises assigning to the instance a second number of instances, WA', belonging to the AAG that are allocable to a single host, wherein the second number of instances, WA', is greater than the first number of instances, WA. The method then comprises reattempting allocation of the instance to a host. The method comprises, following successful allocation, if sufficient capacity for the instance subsequently becomes available on another host and if the WA of the instance would not be exceeded by allocation of the instance to the other host, migrating the instance to the other host. The method comprises, if allocation is unsuccessful, if there is sufficient capacity for the instance available on at least one other host, increasing WA' of the instance and recommencing at reattempting allocation.

The method may minimize the length of time a VNFC instance is unavailable by temporarily allocating the VNFC instance to a host which under normal conditions would not allowed due to anti-affinity, AA, rules, i.e. WA of the instance being exceeded, or due to a lack of required resources. Once capacity for the VNFC instance becomes available on a host other than the one to which it is temporarily allocated, and for which the WA of the instance will not be violated allocating the instance to the host, the VNFC instance is migrated to the new host. When allocation of an instance to a host fails due to an AA rule applying to the AAG to which the instance belongs the method enables temporary violation of the AA rule in a way that may avoid or mitigate a risk of a complete failure of the network in case of one or more further software or hardware faults. The method may enable a temporary violation of AA rules, allocating on the same host the minimum possible number of instances in the same AAG, and restoring the AA rules as soon as there is sufficient capacity available on another host. The number of instances belonging to the same AAG that are allocable to a single host is controlled with the WA parameter. WA' can be assigned to and increased for an individual instance without requiring any change to WA for the rest of the instances belonging to the AAG. Allocation can also fail due to lack of capacity on a host therefore, to avoid wasting time when the problem is also the room on the host, the method terminates when allocation is not possible for this reason. Migrating the instance to another host once sufficient capacity becomes available may ensure that an anti-affinity rule is violated for as short a time as possible.

In an embodiment, the VNFCs are N+M VNFCs. N is a minimum number of instances of a VNFC required to be available and M is a number of redundancy instances of the VNFC, wherein the N+M instances belong to an AAG of instances.

In an embodiment, the method additionally comprises, prior to assigning a second number of instances, WA', to the instance, checking if violation of an anti-affinity rule is permitted for the anti-affinity group to which the instance belongs. This may enable instances to be temporarily allocated to a host so that redundancy is preserved.

In an embodiment, there are N+M hosts for a VNFC. This may improve the likelihood of successful allocation of an instance in a network of N+M hosts, thereby limiting situations where the network is not protected due to M faulty instances.

In an embodiment, when the second number of instances, WA', is increased, the second number of instances, WA', is increased by one.

In an embodiment, the method additionally comprises: storing an identity of the instance and an indication of the first number of instances, WA, of the instance following successful allocation; and stopping using WA' for the instance and returning the instance to the stored WA after migrating the instance to the other host In an embodiment, the method additionally comprises storing an indication of a current WA' of the instance and the magnitude of anti-affinity violation of the instance is a difference between WA and the current WA'.

In an embodiment, the method comprises receiving a plurality of requests relating to a plurality of instances. The migrating is performed according to at least one of magnitude of anti-affinity violation, highest priority first, first-in-first-out and last-in-last-out, when sufficient capacity for at least one instance becomes available.

In an embodiment, the plurality of requests relate to a plurality of instances of a plurality of VNFCs. The instances of each VNFC belong to a respective anti-affinity group, AAG. The method comprises storing an indication of the respective anti-affinity group following successful allocation and migrating is performed additionally according to magnitude of anti-affinity violation of the respective anti-affinity group.

In an embodiment, the method comprises storing in a list an indication of each instance for which allocation is successful, together with the indication of the respective WA of the instance and the indication of the respective current WA' of the instance. The instances are grouped in the list according to their respective anti-affinity group and the list is ordered by magnitude of anti-affinity violation, for both instances and anti-affinity groups.

In an embodiment, the request is received in response to a host to which the instance is initially allocated becoming unavailable due to one of an unplanned event and a planned maintenance action.

In an embodiment, the allocation is one of evacuation, migration, and allocation of a new instance during one of deployment of a virtual network function and scale out of an existing virtual network function. This may improve the likelihood of successful evacuation in a network of N+M hosts, thereby limiting situations where the network is not protected due to M faulty instances.

In an embodiment, the VNFC instances are virtual machines.

In an embodiment, the method performs at least one of synchronization configuring and provisioning for an instance according to the ETSI NFV standard.

In an embodiment, the communications network is a datacentre.

A further aspect of the invention provides a communications network management apparatus comprising a processor and a memory. The memory contains instructions executable by the processor, whereby the apparatus is operative to receive a request to allocate an instance of a virtual network function component, VNFC, to a host, the instance belonging to an anti-affinity group, AAG, of instances. The memory contains further instructions executable by the processor, whereby the apparatus is operative to attempt allocation of the instance. The memory contains further instructions executable by the processor, whereby the apparatus is operative as follows, if allocation of the instance fails because for each host considered for allocation of the instance a first number of instances, WA, belonging to the AAG that are allocable to a single host would be exceeded by allocation of the instance to the host. The apparatus is operative to assign to the instance a second number of instances, WA', belonging to the AAG that are allocable to a single host, wherein WA' is greater than WA. The apparatus is operative to then reattempt allocation of the instance. The apparatus is operative, following successful allocation, if sufficient capacity for the instance subsequently becomes available on another host and if the WA of the instance would not be exceeded by allocation of the instance to the other host, migrate the instance to the other host. The apparatus is operative, following unsuccessful allocation, if there is sufficient capacity for the instance is available on at least one other host, increase WA' of the instance and again reattempt allocation.

The communications network management apparatus may minimize the length of time a VNFC instance is unavailable by temporarily allocating the VNFC instance to a host which under normal conditions would not allowed due to anti-affinity, AA, rules, i.e. WA of the instance being exceeded, or due to a lack of required resources. Once capacity for the VNFC instance becomes available on a host other than the one to which it is temporarily allocated, and for which the WA of the instance will not be violated allocating the instance to the host, the VNFC instance is migrated to the new host. When allocation of an instance to a host fails due to an AA rule applying to the AAG to which the instance belongs the method enables temporary violation of the AA rule in a way that may avoid or mitigate a risk of a complete failure of the network in case of one or more further software or hardware faults. The apparatus may enable a temporary violation of AA rules, allocating on the same host the minimum possible number of instances in the same AAG, and restoring the AA rules as soon as there is sufficient capacity available on another host. The number of instances belonging to the same AAG that are allocable to a single host is controlled with the WA parameter. WA' can be assigned to and increased for an individual instance without requiring any change to WA for the rest of the instances belonging to the AAG. Allocation can also fail due to lack of capacity on a host therefore, to avoid wasting time when the problem is also the room on the host, the method terminates when allocation is not possible for this reason. Migrating the instance to another host once sufficient capacity becomes available may ensure that an anti-affinity rule is violated for as short a time as possible.

In an embodiment, the VNFCs are N+M VNFCs. N is a minimum number of instances of a VNFC required to be available and M is a number of redundancy instances of the VNFC and wherein the N+M instances belong to an AAG of instances.

In an embodiment, the apparatus is additionally operative to, prior to assigning a second number of instances, WA', to the instance, check if violation of an anti-affinity rule is permitted for the anti-affinity group to which the instance belongs. This may enable instances to be temporarily allocated to a host so that redundancy is preserved.

In an embodiment, there are N+M hosts for a VNFC. This may improve the likelihood of successful allocation of an instance in a network of N+M hosts, thereby limiting situations where the network is not protected due to M faulty instances.

In an embodiment, when the second number of instances, WA', is increased, the second number of instances, WA', is increased by one.

In an embodiment, the memory additionally contains instructions executable by the processor whereby the apparatus is additionally operative to: store an identity of the instance and an indication of the first number of instances, WA, following successful allocation; and stopping using WA' for the instance and return the instance to the stored WA after migrating the instance to the other host In an embodiment, the apparatus is additionally operative to store an indication of a current WA' of the instance and the magnitude of anti-affinity violation of the instance is a difference between WA and the current WA'.

In an embodiment, the apparatus is operative to receive a plurality of requests relating to a plurality of instances. The apparatus is configured to perform migration according to at least one of magnitude of anti-affinity violation, highest priority first, first-in-first-out and last-in-last-out, when sufficient capacity for at least one instance becomes available.

In an embodiment, the plurality of requests relate to a plurality of instances of a plurality of VNFCs. The instances of each VNFC belong to a respective anti-affinity group, AAG. The memory contains further instructions executable by the processor, whereby the apparatus is additionally operative to store an indication of the respective anti-affinity group following successful allocation and to perform migration additionally according to magnitude of anti-affinity violation of the respective anti-affinity group.

In an embodiment, the apparatus is additionally operative to store in a list an indication of each instance for which allocation is successful, together with the indication of the respective WA of the instance and the indication of the respective current WA' of the instance. The instances are grouped in the list according to their respective anti-affinity group and the list is ordered by magnitude of anti-affinity violation, for both instances and anti-affinity groups.

In an embodiment, the request is received in response to a host to which the instance is initially allocated becoming unavailable due to one of an unplanned event and a planned maintenance action.

In an embodiment, the allocation is one of evacuation, migration, and allocation of a new instance during one of deployment of a virtual network function and scale out of an existing virtual network function. This may improve the likelihood of successful evacuation in a network of N+M hosts, thereby limiting situations where the network is not protected due to M faulty instances.

In an embodiment, the VNFC instances are virtual machines.

In an embodiment, the apparatus is additionally operative to perform at least one of synchronization configuring and provisioning for an instance according to the ETSI NFV standard.

In an embodiment, the communications network management apparatus is one of a virtualized network function, VNF, manager of an NFV-MANO architectural framework and an NFV orchestrator, NFVO, of an NFV-MANO architectural framework.

In an embodiment, the communications network is a datacentre.

A further aspect of the invention provides a computer program, comprising instructions which, when executed on at least one processor, cause the at least one processor to carry out any of the above steps of the method of managing a communications network comprising a plurality of hosts by allocating instances of virtual network function components to hosts.

A further aspect of the invention provides a carrier containing a computer program, comprising instructions which, when executed on at least one processor, cause the at least one processor to carry out any of the above steps of the method of managing a communications network comprising a plurality of hosts by allocating instances of virtual network function components to hosts.

In an embodiment, the carrier is one of an electronic signal, optical signal, radio signal, or computer readable storage medium.

A further aspect of the invention provides communications network management apparatus comprising:

a receiving module for receiving a request to allocate an instance of a virtual network function component, VNFC, to a host, the instance belonging to an anti-affinity group, AAG, of instances;

an allocation module for attempting allocation of the instance to a host;

a WA module for assigning to the instance a second number of instances, WA', belonging to the AAG that are allocable to a single host if allocation of the instance fails because for each host considered for allocation of the instance a first number of instances, WA, belonging to the AAG that are allocable to a single host would be exceeded by allocation of the instance to the host; and a migration module for migrating the instance to another host if sufficient capacity for the instance subsequently becomes available on another host and if the WA of the instance would not be exceeded by allocation of the instance to the other host. The migration module is for migrating the instance to the other host following successful allocation of the instance. The WA module is additionally for increasing WA' of the instance if allocation is unsuccessful, if there is sufficient capacity for the instance available on at least one other host, and then recommencing at reattempting allocation. The allocation module is additionally for reattempting allocation of the instance to a host after increasing WA' of the instance by the WA module. The second number of instances, WA', is greater than the first number of instances, WA.

DETAILED DESCRIPTION

Figure 1:
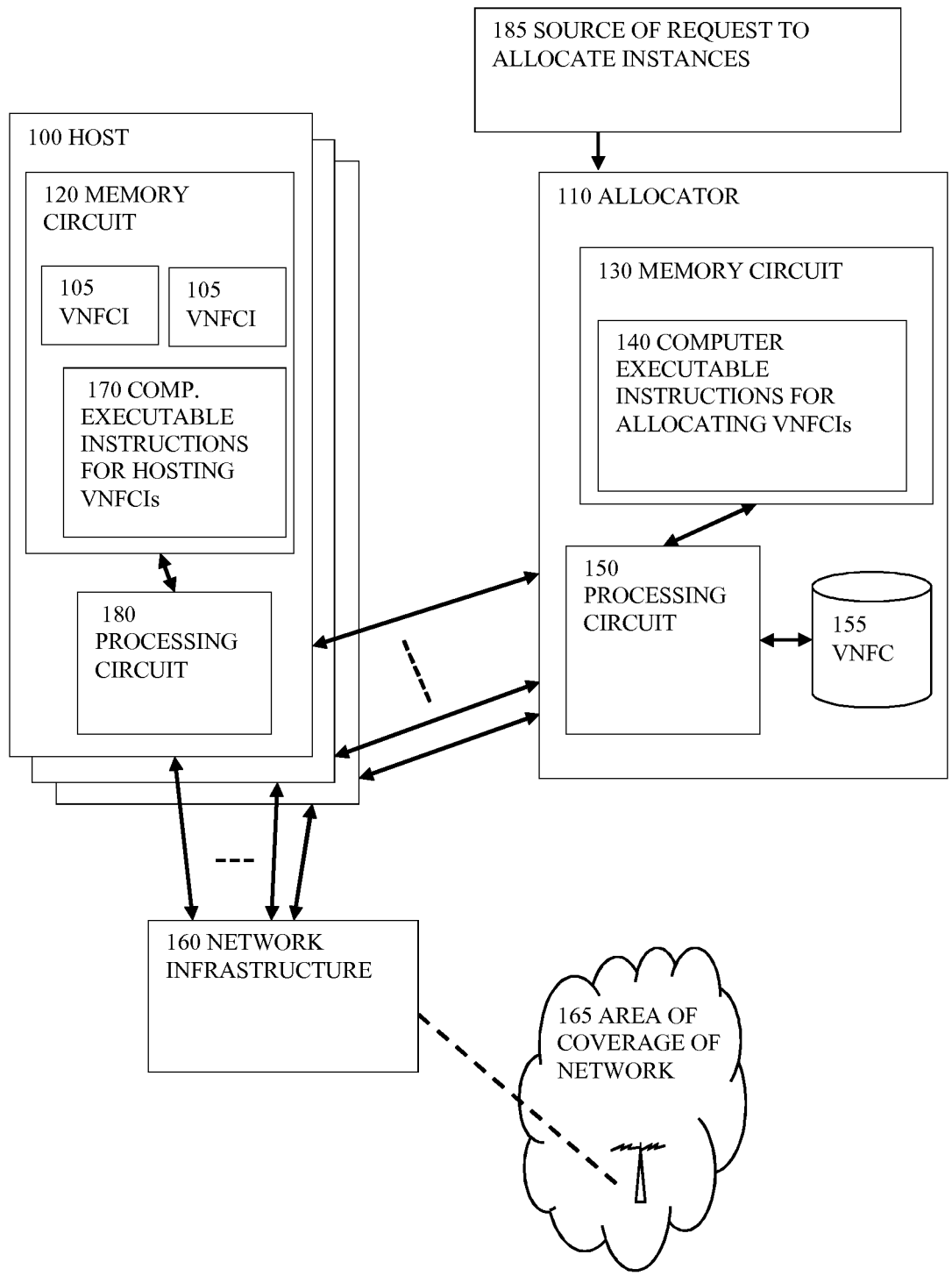
FIG. 1 shows a schematic view of communications network management apparatus according to an embodiment of the invention.

Embodiments of the invention will now be described, by way of example only, with reference to the accompanying drawings. The same reference numbers will used for corresponding features in different embodiments.

References to software can encompass any type of programs in any language executable directly or indirectly on processing hardware.

References to processors, hardware, processing hardware or circuitry can encompass any kind of logic or analogue circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

The following definitions are used herein:

Network Function, NF: A functional block, FB, within a network infrastructure which has well-defined external interfaces and well-defined functional behaviour. Examples can include packet inspectors, address translators, firewalls, filters, aggregators and so on.

Virtual Machine, VM: a virtualized computation environment which behaves very much like a physical computer/server.

Virtualized Network Function, VNF: An implementation of an executable software program that constitutes the whole or a part of an NF and can be deployed on a virtualization infrastructure. A VNF is described by its descriptor file, instantiated by the VNF Manager or NFVO.

Virtual Network Function Component, VNFC: a sub function of a VNF, or in some cases an entire VNF, which is hosted by a single VM type is called a Virtual Network Function Component.

VNFC Instance, VNFCI: a run-time instantiation of the VNFC; maps to a network functions virtualization infrastructure, NFVI, Virtualized container, for instance a VM.

VNF Instance: a run-time instantiation of the VNF, resulting from completing the instantiation of VNF, using the VNF deployment and operational information captured in the VNF Descriptor, as well as additional run-time instance-specific information and constraints. VNF Instance consists of one or more VNFC instances, VNFCI.

Virtualization Deployment Unit, VDU: a construct that can be used in an information model, supporting the description of the deployment and operational behaviour of a subset of a VNF, or the entire VNF if it was not componentized in subsets.

Hypervisor: a piece of computer software, firmware or hardware that creates and runs virtual machines, VM.

Host: a computer on which a hypervisor is running one or more VNFC instances, such as virtual machines, VM, is defined as a host machine. Each instance can also be referred to as a virtual machine or guest machine or guest operating system. The hypervisor presents these instances with a virtual operating platform and manages the execution of the instance, or guest operating system. Multiple instances of a variety of operating systems may share the virtualized hardware resources.

When designing the virtual infrastructure services, administrators consider both the structure of the individual virtual machine and the interactions between all of the virtual machines in the environment, as they come online, move, and expire. Different components of the VNF will run in different VM's. VM's can be of different types depending on the software running in the VM. VM can be grouped according to the type of function that the component is responsible of. Within each group of VM's that implement a component one or more can be active at any moment.

Typically a telecommunication system, to reach a telecom grade high availability, is implemented with some degree of redundancy, both in hardware as well as in software. N+M redundancy models which include at minimum systems with 1+1 redundant schemes are implemented in the system. Each logical component of the N+M system maps either to a dedicated hardware or to a virtual machine on server hardware. In such a virtualized context a virtual machine shall not run on the same server hardware as other virtual machines that are part of the same redundancy group. This is important because when one of the server hardware or dedicated hardware is not available due to Compute Host Failure or Compute Host OS upgrade or server hardware upgrades, the other components running must be able to provide the service. Systems normally have a redundancy mechanism to protect themselves from hardware, HW, and/or software, SW, faults. One or more VNFCI are added for redundancy. So a generic system is constituted of N+M VNFCI, where N is the minimum number of VNFCI needed and M is the number of VNFCI added for redundancy for HW/SW fault tolerance.

The initial deployment of a VNF with a component, VNFC, having redundancy of N+M shall always guarantee that at least N VNFC instances are working at any time.

Affinity indicates the rule by which a group of VM within a VNF implement a scalable and reliable function. An affinity group, AG, defines the VM's that should be located together in order for the component function to work according to expectations. Anti-Affinity policy in contrast defines the VM's that should not be in the same location. Affinity policy is limited by the capacity of available resources of the hypervisor that hosts the AG, while Anti-Affinity is limited by the number of available hypervisors within a datacentre network.

Anti-Affinity is designed to make sure that if there are faults in a hypervisor and/or on the underlying hardware, a function offered by a VNFC can still be provided by the other VM's in the group running on different hypervisors and/or hardware. In Virtual/Cloud environments Anti-Affinity rules prevent more than one VNFCI from the same N+M redundancy group being loaded on the same host, to prevent a single HW/Hypervisor fault causing redundancy loss. Anti-Affinity rules for an N+M redundancy system require at least N+M hosts.

FIG. 1 shows a schematic view of communications network management apparatus 110 according to an embodiment of the invention. The apparatus is for managing a communications network comprising a plurality of hosts by allocating instances of virtual network function components to hosts. The apparatus comprises a processor and a memory containing instructions executable by the processor, whereby the apparatus is operative to:

receive a request to allocate an instance of a virtual network function component, VNFC, to a host, 100, the instance belonging to an anti-affinity group, AAG, of instances;

attempt allocation of the instance; and if allocation of the instance fails because for each host considered for allocation of the instance a first number of instances, WA, belonging to the AAG that are allocable to a single host would be exceeded by allocation of the instance to the host:
  i. assign to the instance a second number of instances, WA', belonging to the AAG that are allocable to a single host, wherein WA' is greater than WA;
  ii. reattempt allocation of the instance; and
  iii. following successful allocation, if sufficient capacity for the instance subsequently becomes available on another host and if the WA of the instance would not be exceeded by allocation of the instance to the other host, migrate the instance to the other host; or
  iv. following unsuccessful allocation, if there is sufficient capacity for the instance available on at least one host, increase WA' of the instance and again reattempt allocation.

An anti-affinity group, AAG, is a group of instances that, according to an anti-affinity rule, should not be located on the same host.

FIG. 1 does not show further details of how the virtual network functions and their instantiations are managed, as there are various possible implementations. One version is described with reference to FIG. 10 based on the ETSI NFV standard.

In one embodiment, the apparatus is exemplified by an allocator 110 coupled to receive requests to allocate instances to hosts, from a source 185 of the requests. This can be for example an operations support system, OSS, or a network operator, or another part of the network management. The processor takes the form of a processing circuit 150 and the memory takes the form of a memory circuit 130 for storing computer executable instructions for allocating VNFCIs. The allocator also comprises a store 155, which may be the same physical memory as memory circuit 130, for storing the VNFC which is to be shared across the instances. Also shown are a plurality of hosts 100, to which the instances are to be allocated. Each host is shown as comprising a processing circuit 180, coupled to a memory circuit 120 for storing computer executable instructions 170 for hosting instances, and the instructions 105 defining the instances hosted by that host. These hosts can be located remotely or co-located with network infrastructure 160 which is managed to carry the traffic of the communications network. The communications network may be a mobile network for example having an area of coverage 165, though any other kind of communications network can be envisaged.

Figure 2:
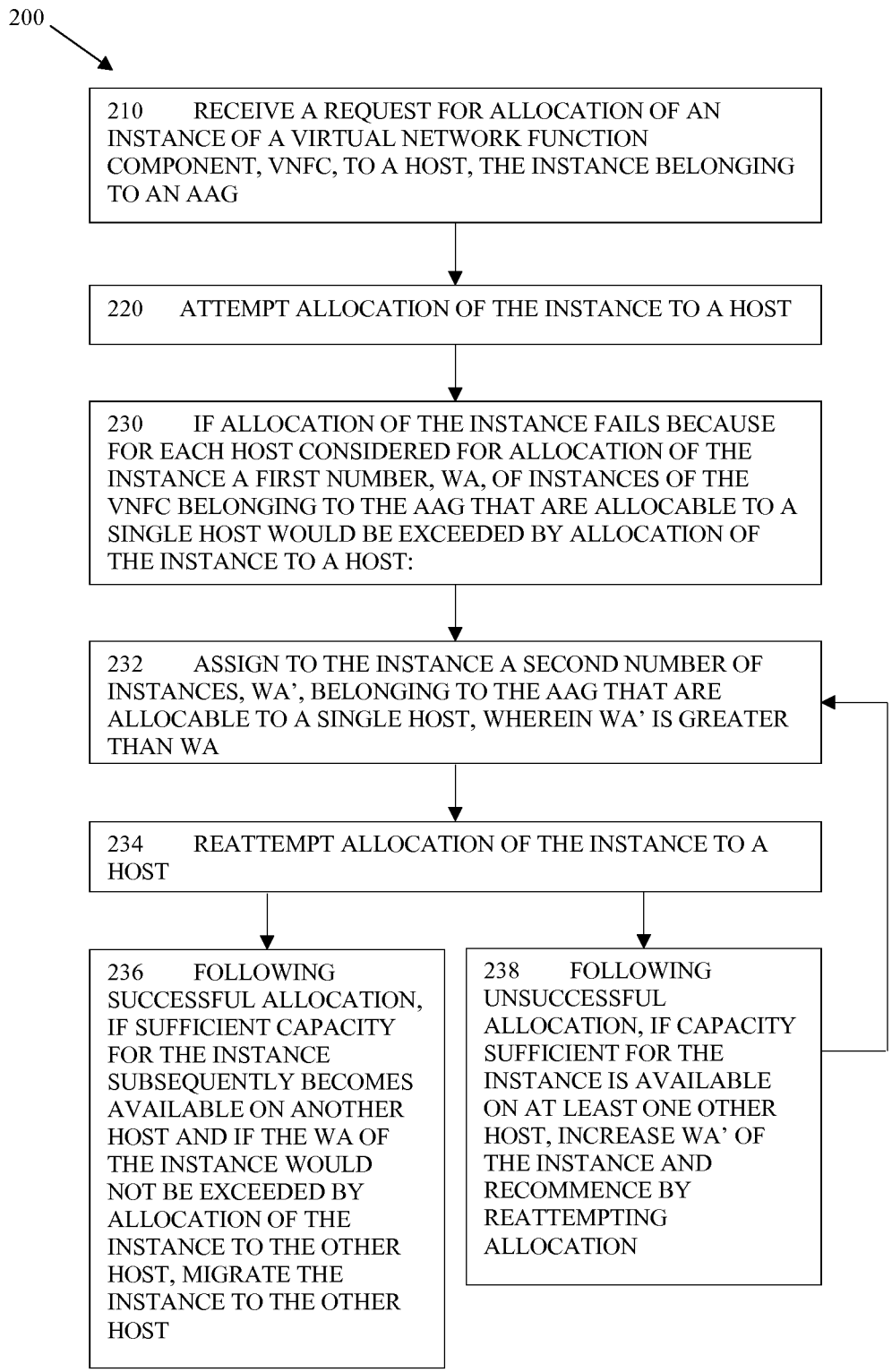
FIG. 2 illustrates a method according to an embodiment of the invention of managing a communications network.

Referring to FIG. 2, an embodiment of the invention provides a method 200 of managing a communications network comprising a plurality of hosts by allocating instances of virtual network function components, VNFCI, to hosts. The method comprises receiving 210 a request for allocation of an instance of a virtual network function component, VNFC, to a host and then attempting allocation 220 of the instance. The instance belongs to an anti-affinity group, AAG, of instances. The method additionally comprises, if allocation of the instance fails 230 because for each host considered for allocation of the instance a first number of instances, WA, of the VNFC belonging to the AAG that are allocable to a single host would be exceeded by allocation of the instance to the host:
  i. assigning 232 to the instance a second number of instances, WA', belonging to the AAG that are allocable to a single host, wherein WA' is greater than WA;
  ii. reattempting allocation 234 of the instance; and
  iii. following successful allocation, if sufficient capacity for the instance subsequently becomes available on another host and if the WA of the instance would not be exceeded by allocation of the instance to the other host, migrating 236 the instance to the other host; or
  iv. following unsuccessful allocation, if there is sufficient capacity for the instance available on at least one host, increasing WA' of the instance and recommencing at reattempting allocation 238.

In an embodiment, the VNFCs are N+M VNFCs, where N is a minimum number of instances of a VNFC required to be available and M is a number of redundancy instances of the VNFC. The N+M instances of the VNFC belong to an anti-affinity group. An anti-affinity group, AAG, is a group of instances that, according to an anti-affinity rule, should not be located on the same host.

Figure 3:
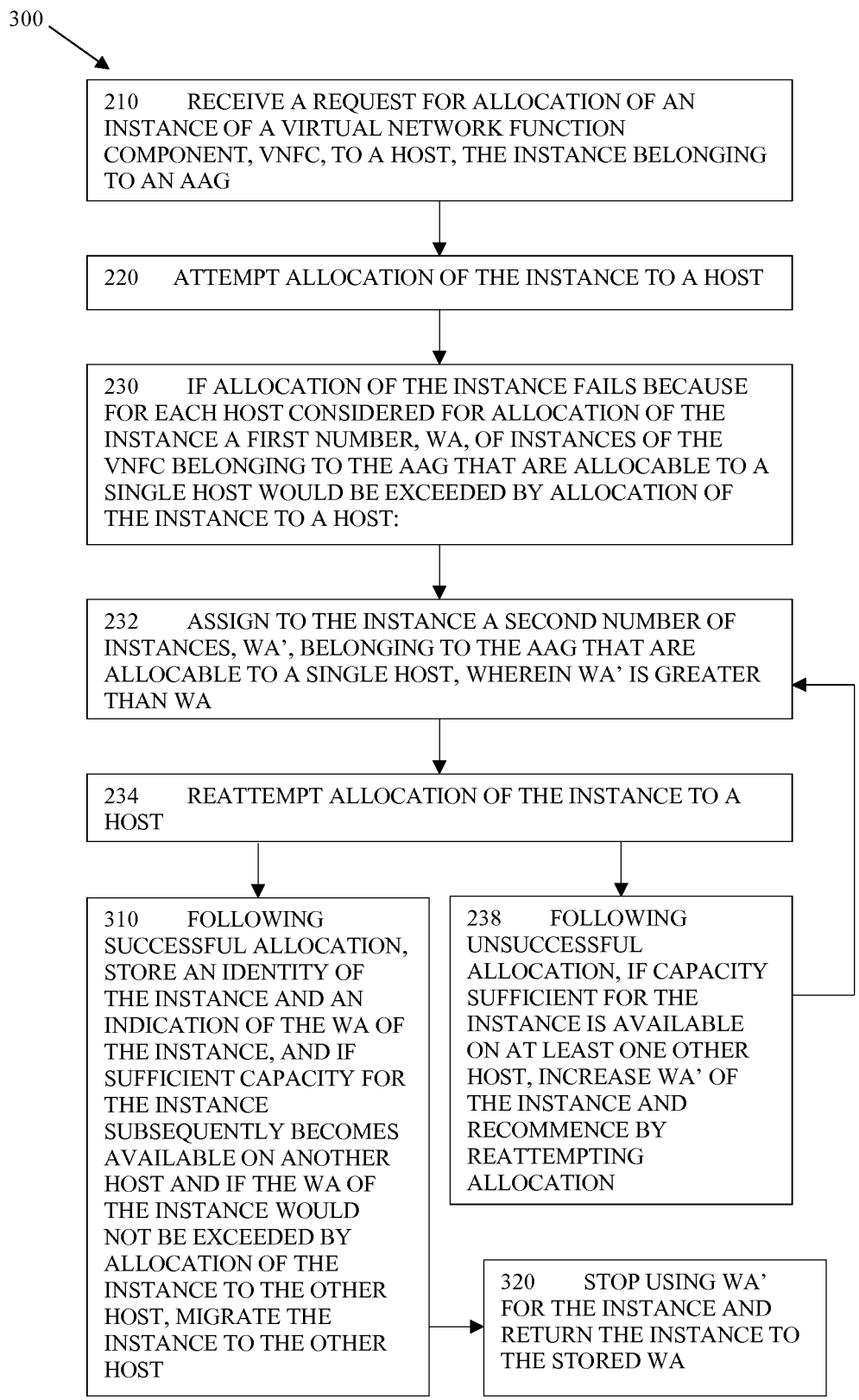
FIG. 3 illustrates a method according to an embodiment of the invention of managing a communications network.

In a further embodiment, illustrated in FIG. 3, a method 300 of managing a communications network comprising a plurality of hosts by allocating VNFCIs to hosts is provided which additionally comprises storing 310 an indication of an identity of the instance and an indication of the WA of the instance following successful allocation. The method 300 additionally comprises stopping using WA' for the instance and returning 320 the instance to the stored WA after migrating the instance to the other host.

Figure 4:
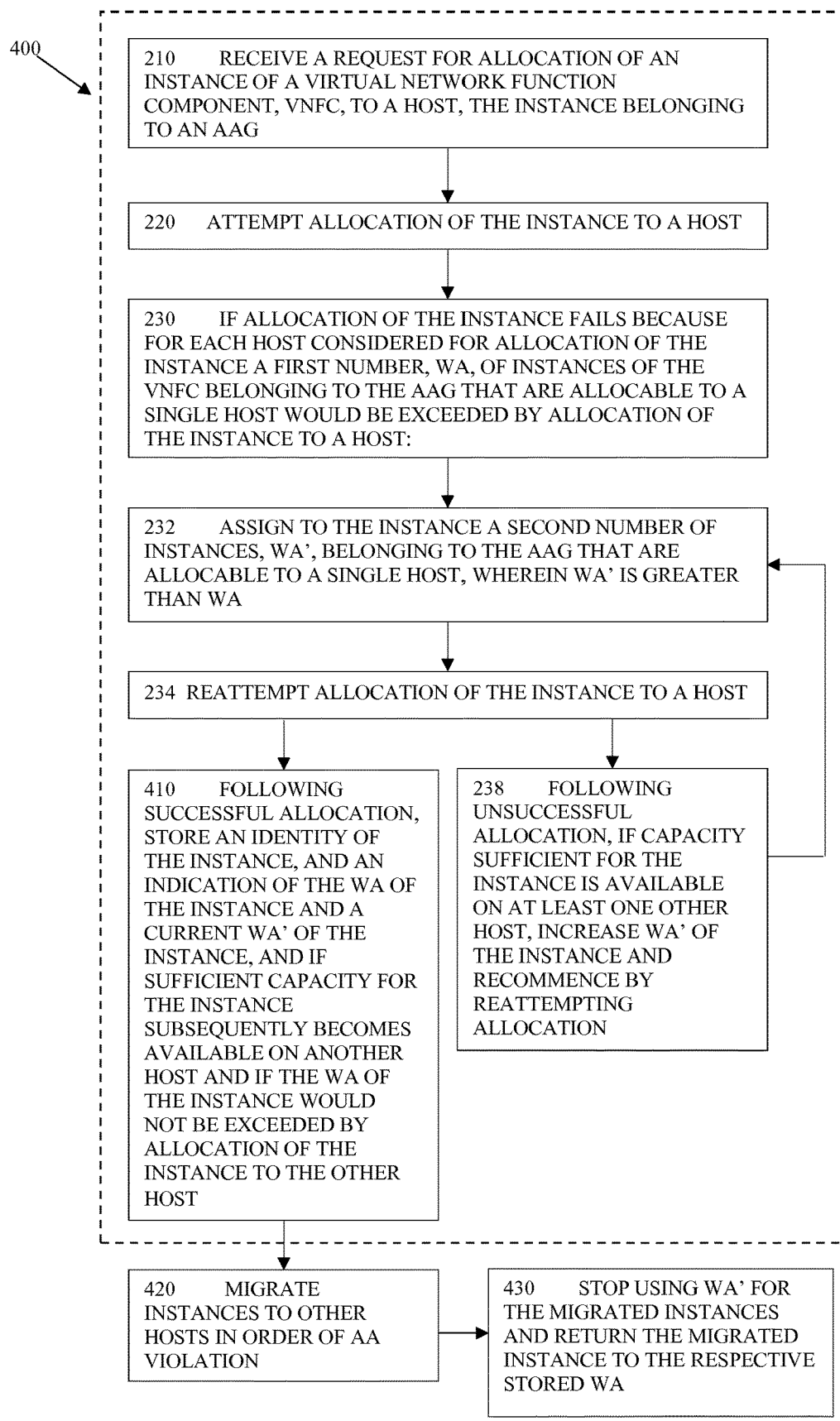
FIG. 4 illustrates a method according to an embodiment of the invention of managing a communications network.

Referring to FIG. 4, an embodiment of the invention provides a method 400 of managing a communications network comprising a plurality of hosts by allocating instances of virtual network function components, VNFCI, to hosts.

In this embodiment, a plurality of requests are received relating to a plurality of instances. The method 400 proceeds as described in the previous embodiment, illustrated in FIG. 3, for each instance for which a request is received (illustrated within the dashed lines), and additionally comprises storing 410 an indication of current WA' of the instance. The identity of the instance, the WA of the instance and the current WA' of the instance may be stored in a list. When sufficient capacity for at least one instance becomes available, migration 420 is performed for at least one of the VNFCIs for which the WA and the current WA' are stored, according to magnitude of anti-affinity violation of each of these VNFCIs. Magnitude of anti-affinity violation is a difference between the WA and the current WA', as stored for the VNFCI. After migrating an instance to its new host, WA' is no longer used for the instance and the instance is returned to the stored WA.

In alternative embodiment, migration may be performed according to highest priority first, first-in-first-out and last-in-last-out, instead of or in addition to magnitude of anti-affinity violation. First-in-first-out and last-in-last-out are particularly of relevance when the identity of the instance, the WA of the instance and the current WA' of the instance are stored in a list.

Figure 5:
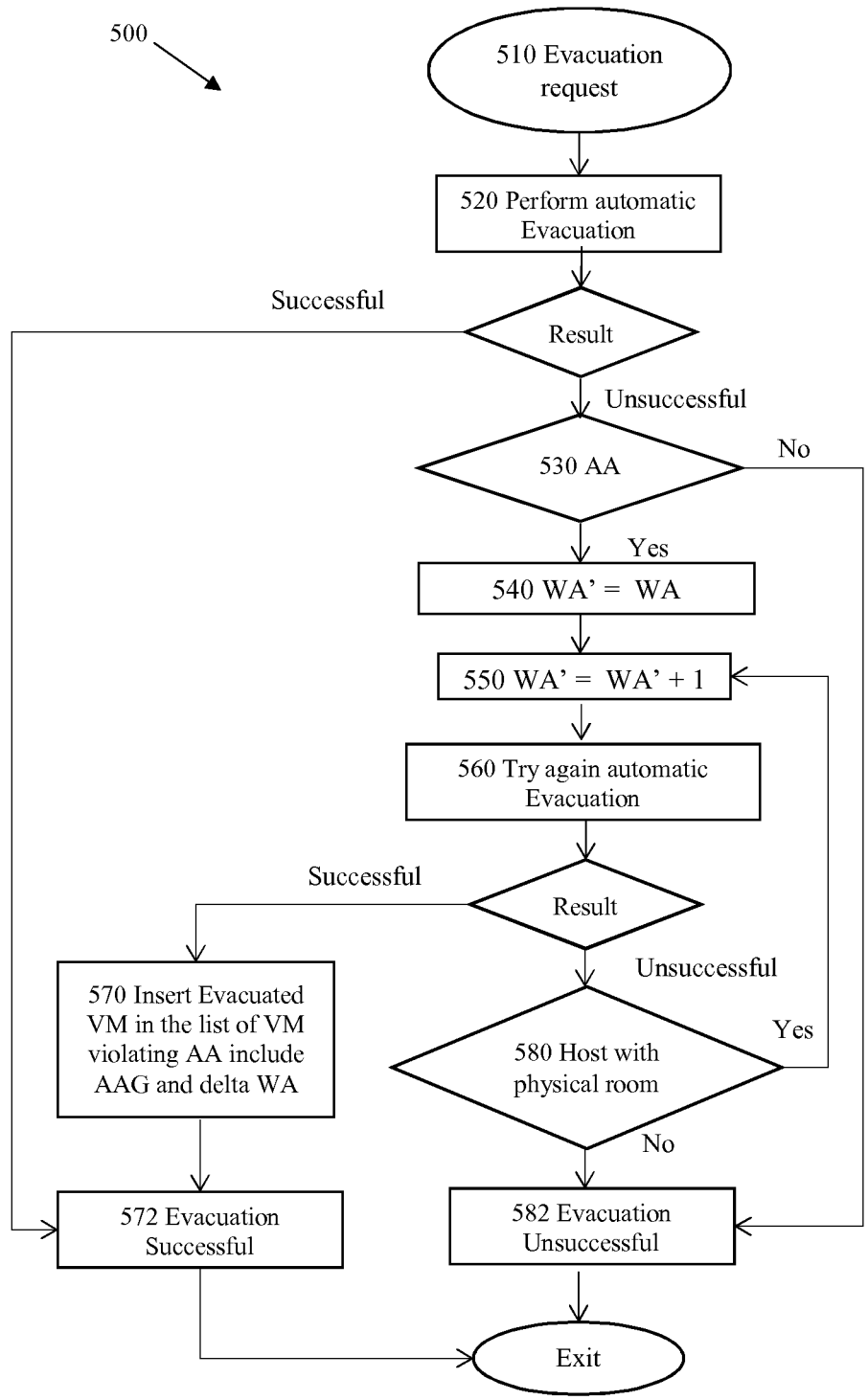
FIG. 5 illustrates a method according to an embodiment of the invention of managing a communications network.
Figure 6:
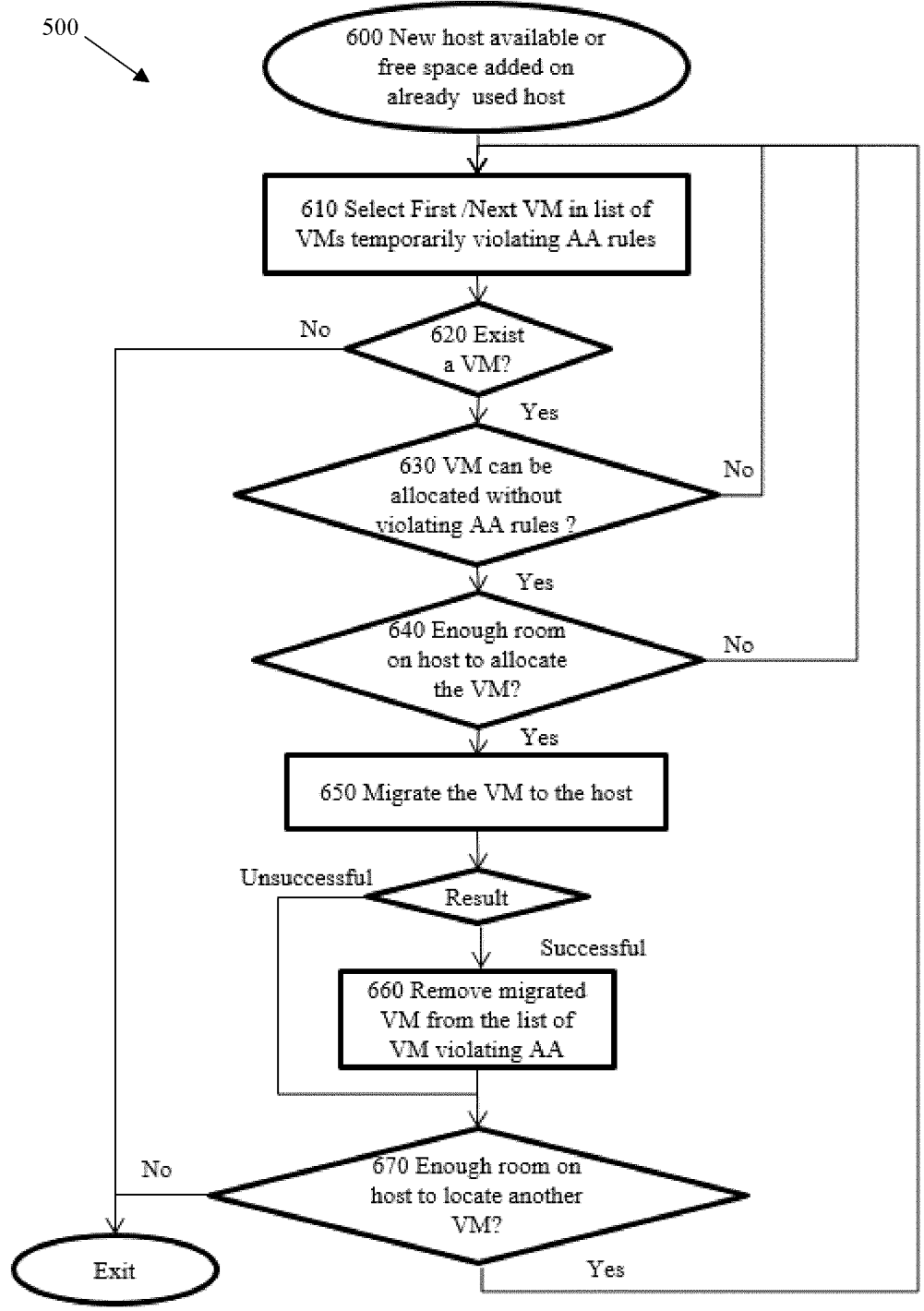
FIG. 6 illustrates a method according to an embodiment of the invention of managing a communications network.

Referring to FIGS. 5 and 6, an embodiment of the invention provides a method 500 of managing a communications network, in this case a datacentre, comprising a plurality of hosts by allocating instances of a VNFC to hosts.

In this embodiment, the VNFC instances are virtual machines, VM, and the request for allocation is a request for evacuation, received in response to a host to which the instance is initially allocated becoming unavailable due to an unplanned event.

Situations that result in a hypervisor, or server hardware where the hypervisor is running, not being available, are handled with a process referred to as evacuation. Evacuation results in moving all the VMs loaded on the faulty host to one or more other hosts. After a failure on the VNFC level, a currently loaded instance is discarded and a new instance is requested. If the VNFC failure is due to host failure, the action of "Discard and re-instantiate" all the instances on the failed host is also called evacuation; in re-instantiation of the VMs of the host onto another host, not necessarily the same new host is used for all VMs from the failed host. During evacuation all configurations of the VM are moved to the new host, e.g. IP address, VM name. Evacuation is a functionality that can be used when unplanned VNFC instance downtime occurs, as compared to migration which is a planned event and occurs while the VM/VNFCI is still working. In this context, these unplanned VNFC instance downtimes are mainly related to fatal faults in the host SW or HW causing affected VMs to be unavailable. Besides the fatal faults, other reasons such as datacentre-operator reset of a host, where the communications network is a datacentre, may allow evacuation to trigger.

The method comprises receiving 510 a request for evacuation of a VM from a faulty host to a new host and then attempting evacuation 520 of the VM. The method 500 may be considered as Phase 1, "Temporary violation of Anti-Affinity rule", illustrated in FIG. 5 and Phase 2, "Fast recovery of original configuration", illustrated in FIG. 6.

In phase 1, in the case of unsuccessful evacuation due to Anti-Affinity rules and lack of HW resources, the method 500 comprises:

1. Check 530 if a parameter Evacuation-without AA is enabled; if so set 540 WA'=WA and continue, otherwise exit (No Evacuation performed).
2. Increase 550 WA' by 1 (WA'=WA'+1)
3. Try again to perform Evacuation 560.
4. If evacuation is successful, insert 570 the evacuated VM (together with its WA and the current WA') in a list of VMs to be migrated to another host as soon as sufficient capacity becomes available in order to comply with the Anti-Affinity rule, exit (no other action are needed).
5. If evacuation is unsuccessful, if there is sufficient capacity, i.e. physical room, on at least one host for the VM then go to 2.
6. (Otherwise) No capacity exists in the datacentre to migrate the VM, exit.

In phase 2, when an additional host becomes available or sufficient capacity becomes available on an existing host 600, the method comprises checking whether there are any VMs in the list of VMs to be migrated. If so, it starts 610 the migration with the VM with the greatest AA violation (greatest difference between WA and current WA'). The method comprises checking 630 whether the VM can be allocated to the new host without violating the anti-affinity, AA, rules applying to that host. If yes, the method comprises checking 640 whether there is sufficient capacity, enough room, on the new host to allocate the VM. If yes, the VM is migrated 650 to the new host. Assuming this migration is successful, the migrated VM is removed 660 from the list of VMs to be migrated (being the VMs that are temporarily violating AA). Then a check 670 is made as to whether there is sufficient capacity, i.e. room, on the new host to locate another VM. If yes, the method continues by selecting 610 the next VM in the list. After a successful migration of the VM, the VM no longer uses WA' and is returned to its stored WA.

The method 500 continues until one of the following conditions are fulfilled:
  List of VMs to be migrated is empty
  Insufficient capacity is available on the new host
  All the VMs in the list have been checked and cannot be migrated to the other host.

The method for migrating the VMs temporarily violating the AA rules can be improved by also considering the anti-affinity group of the VMs. For example, if a VM cannot be migrated because its AA rule would also be violated on the new host, WA of the VM would be exceeded on the new host, do not check all the other VMs in the list belonging to the same AAG.

The method 500 is able to distribute VMs requiring evacuation on available hosts while avoiding a situation where most VMs, due to the temporary violation of the Anti-Affinity rules, are located on the same host. VM group synchronization configuration and/or provisioning will be based on ETSI NFV standard.

If anti-affinity is set for a VNFC type the VNFC instances will be allocated each to a different host. The method 500 uses a new parameter for each VM anti-affinity group that indicated that AA rules can be temporarily violated, which enables VMs to be allocated to hosts in violation of an AA rule so that redundancy is preserved when a host becomes unavailable and the VM that cannot be evacuated is the last one to guarantee the redundancy.

The method 500 allows a violation of the Anti-affinity rules that is limited in time as much as possible and enables fast recovery of the original setup of the VMs and restoration of the original capacity and therefore the capacity to deliver service. It must be considered that the probability of a fault is higher when systems are running with high load; higher temperature of the HW components for instance is a known factor that causes HW faults occurrences to happen more frequently.

The method 500 solves the problem of unsuccessful evacuation of an N+M active-active redundant system through:

New properties (or extension) in VNF Manager for N+M redundancy to temporarily violate Anti Affinity in case of Evacuation.

Creation of a list of VMs that needs to be migrated, as soon as another host is available, in order to completely fulfill the Anti-Affinity rules.

New algorithm among NFV ETSI entities to realize a new way to manage temporary VNFCI allocation in case of unsuccessful evacuation Return back to normal situation (location according to Anti-Affinity) when the problem has been solved (hosts are again available).

Scaling for capacity (if happened at the same time) shall be considered before WA can be released.

Figure 7:
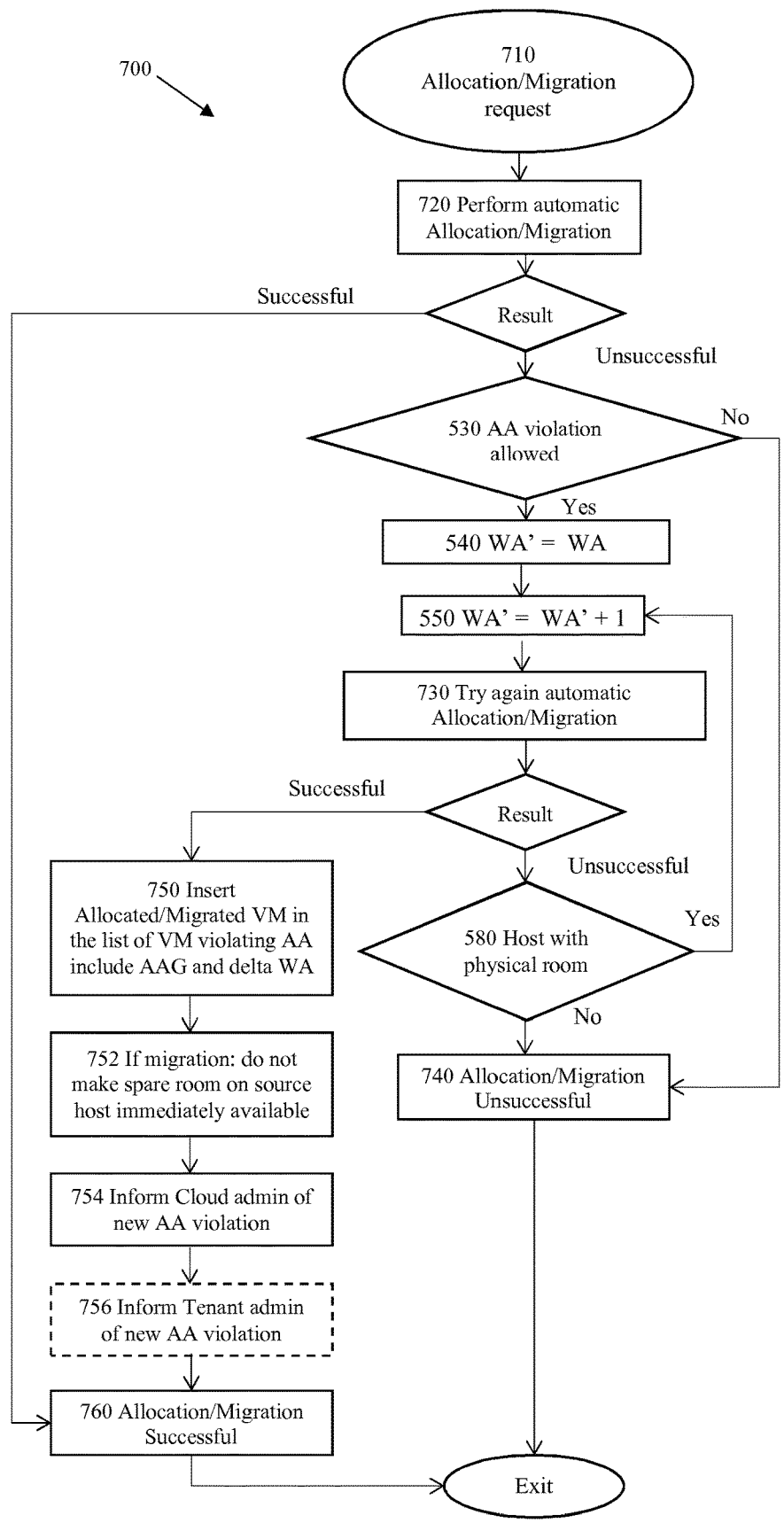
FIG. 7 illustrates a method according to an embodiment of the invention of managing a communications network.
Figure 8:
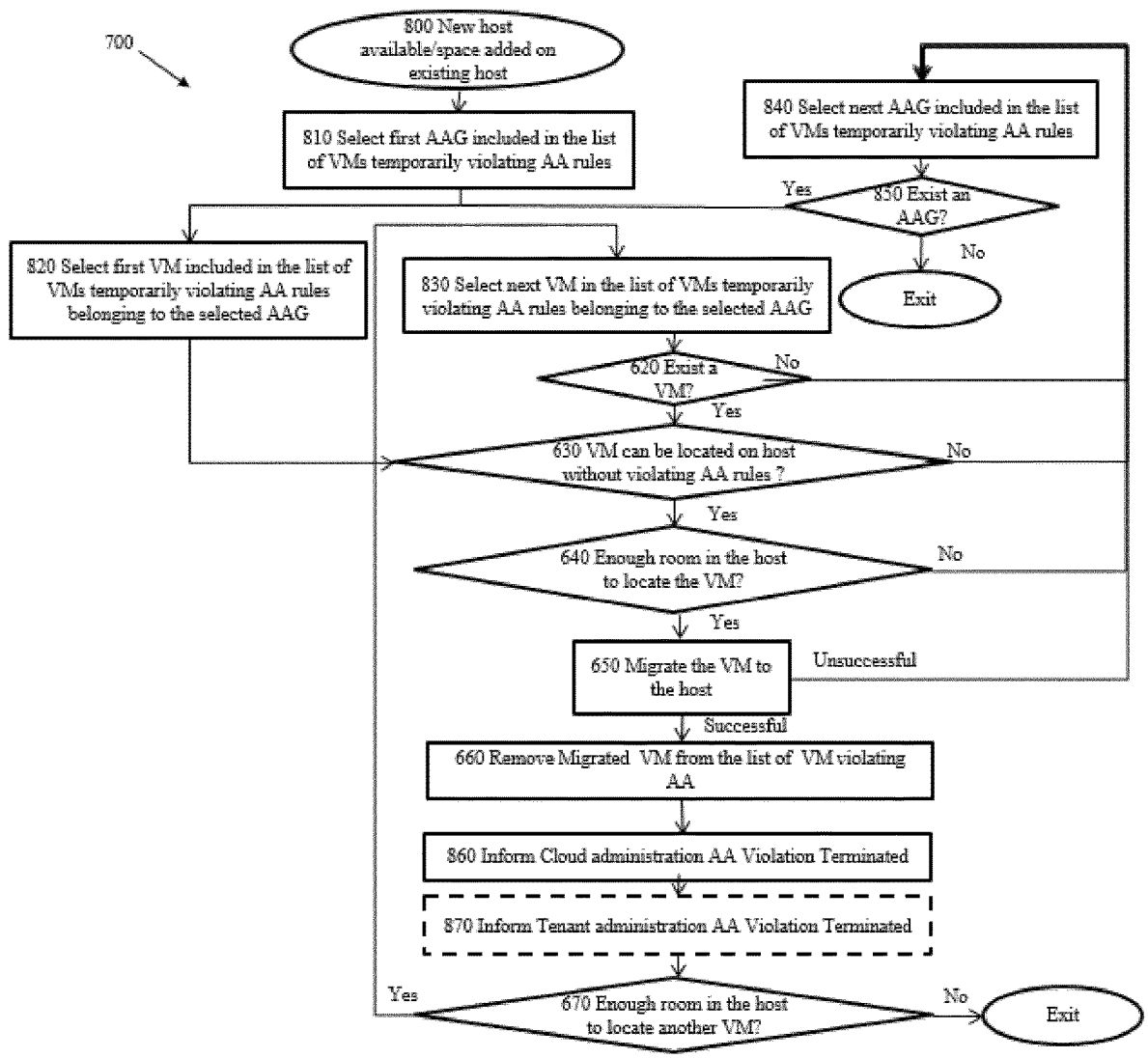
FIG. 8 illustrates a method according to an embodiment of the invention of managing a communications network.

Referring to FIGS. 7 and 8, an embodiment of the invention provides a method 700 of managing a communications network, in this case a datacentre, comprising a plurality of hosts by allocating instances of a VNFC to hosts.

In this embodiment, the VNFC instances are again virtual machines, VM, and the request for allocation is a request for initial allocation, during deployment or scale out, or a request for migration, which may also be considered to be a re-allocation.

The method comprises receiving 710 a request for allocation or a request for migration of a VM from its current host to a new host and then attempting allocation/migration 720 of the VM. The method 700 may be considered as comprising Phase 1, "Temporary violation of Anti-Affinity rule", illustrated in FIG. 7 and Phase 2, "Fast recovery of original configuration", illustrated in FIG. 8.

In phase 1, in the case of unsuccessful allocation of a new VM or unsuccessful migration of a VM due to Anti-Affinity rules and lack of HW resources, the method 700 comprises:

1. Check 530 if a parameter "Allocation-without AA", in the case of an initial deployment or scale out, or "Migration-without AA", in the case of normal migration or urgent migration, is enabled; if so set 540 WA'=WA and continue, otherwise exit (No Allocation/Migration performed).

2. Increase 550 WA' by 1 (WA'=WA'+1)

3. Try again to perform 730 allocation/migration.

4. If allocation/migration is successful store 750 an indication of this VM, together with an indication of the WA and the current WA' of this VM in a list of VMs to be migrated to another host as soon sufficient capacity becomes available, in order to comply with the Anti-Affinity rule, go to 7.

5. If allocation/migration is unsuccessful and if 580 there is sufficient capacity, physical room, on at least one host to locate the VM then go to 2.

6. Otherwise 740, sufficient capacity, physical room, does not exist in the communications network to allocate the VM, exit without allocating or migrating the VM.

7. If migration, do not make 752 the capacity on the temporary host that has just been vacated by the VM immediately available for another VM. Send 754 a notification to Cloud Administration advising of the AA violation.

8. Check if Tenant wants to be notified, if so advise 756 Tenant of the AA violation. This is optional.

9. If migration Go to 10, otherwise exit.

10. If the migration it is an automatic migration, do not check if any VM from the list of VMs to be migrated on another host can be allocated on the temporary host (from which the VM has just been migrated) and exit 11. If the migration is a manual migration, ask network operator if the temporary host is available for allocation to it of another VM from the list of VMs to be migrated, belonging to the same or a different Anti-Affinity Group of the just migrated VM.

12. If the temporary host is available for another VM go to Phase 2 800 and try to migrate any VM remaining in the list according to operator answer. Otherwise do not check if any VM from the list of VMs to be migrated on another host can be allocated on the temporary host (from which the VM has just been migrated) and exit.

In phase 2, when an additional host becomes available or sufficient capacity becomes available on an existing host 800, the method comprises checking whether there are any VMs in the list of VMs to be migrated. If so, it starts 810 the migration with the AAG with the greatest AA violation (greatest difference between WA and current WA') and then selects 820 the VM with the greatest AA violation within the selected AAG. It will be understood that migration may alternatively be performed according to priorities assigned to the AAGs and VMs, or according to first-in-first-out or last-in-last-out.

The method comprises checking 630 whether the VM can be allocated to the new host without violating an anti-affinity, AA, rule applying to the VM. If yes, the method comprises checking 640 whether there is sufficient capacity, enough room, on the new host to allocate the VM. If yes, the VM is migrated 650 to the new host. Assuming this migration is successful, the migrated VM is removed 660 from the list of VMs to be migrated (being the VMs that are temporarily violating AA). Any time a VM is removed from the list of VM to be migrated, a notification is sent 860 to Cloud Administration, and if the option is selected notification is sent 870 also to Tenant Administration. Then a check 670 is made as to whether there is sufficient capacity, i.e. room, on the new host to locate another VM. If yes, the method continues by selecting 830 the next VM in the selected AAG, and then selecting the next AAG and so on. After a successful migration of the VM, WA' is no longer used for the VM and the VM is returned to the stored WA.

The method 700 continues until one of the following conditions are fulfilled:

List of VMs to be migrated is empty

Insufficient capacity is available on the new host

All the VMs in the list have been checked and cannot be migrated to the other host.

The method 700, in case of unsuccessful Allocation, due to Anti-Affinity rules and lack of HW resources, during maintenance activities and/or VNF specific activities such as first deployment and scale out, enables temporary violation of AA rules in a way to avoid or at least to reduce the risks to have a complete failure of the communications network in case of SW/HW faults. The method 700 may enable distribution of VMs on available hosts avoiding a situation where most VMs, due to the temporary violation of the Anti-Affinity rules, are located on the same host.

The method 700 solves the problem of unsuccessful allocation of a VM belonging to an N+M active-active redundant system through:

New properties (or extension) in VNF Manager to temporarily violate Anti Affinity in case of new VM instantiation (First Deployment or Scale Out).

New properties (or extension) in VNF Manager to temporary violate Anti Affinity in case of Automatic Migration. This parameter may also include an indication of a level of allowed Migration, i.e. whether all migration can temporarily violate AA rules in this manner or whether only urgent migration can.

New parameter to be associated with migration to distinguish among urgent Migration (that cannot be postponed) and normal Migration.

New properties (or extension) in VNF Manager to allow notification to Tenant about the temporary violation of the Anti-Affinity rules. This parameter may be configured with the type of notification to send and the period of repetition of the notification.

New state "Isolating" of the hosts that are subjected to a rolling update. A host in Isolating state cannot accept allocation of new VMs. VMs already allocated on it will be soon migrated automatically or manually. This will avoid deadlock situation and will speed up the update.

Creation of a list of VMs that need to be migrated, as soon as another host is available, in order to completely fulfill the Anti-Affinity rules.

New algorithm among NFV ETSI entities to realize a new way to manage temporary VNFCI allocation in case of unsuccessful evacuation.

Return back to normal situation (allocation according to Anti-Affinity) when the problem has been solved (hosts are again available).

Alarm or warning transmitted to Cloud Administration informing about the Anti-Affinity rule violation.

Alarm or warning transmitted to Tenant Administration informing about the Anti-Affinity rule violation.

Manual allocation or migration refers to allocation or migration which requires input from a communications network, for example a datacentre, operator. In contrast, in automatic allocation or migration the method 500, 700 operates without any input from an operator.

Figure 9:
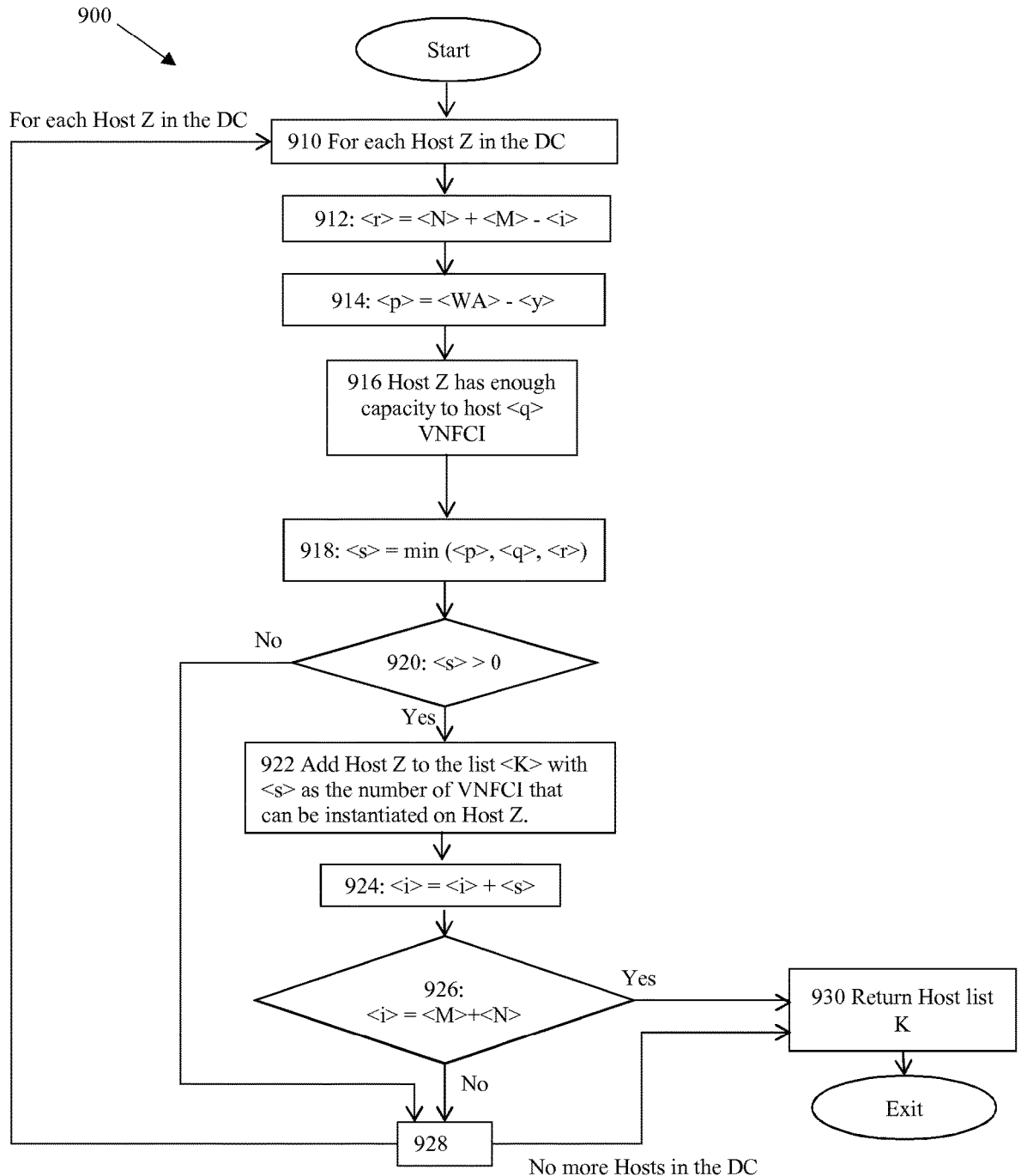
FIG. 9 illustrates allocating an instance.

The methods 200, 300, 400, 500, 700 described with reference to FIGS. 2 to 8 include attempting allocation 220, 234, 520, 560, 720, 730. FIG. 9 illustrates the process 900 of attempting allocation.

The process 900 comprises, for each host Z in the network/datacentre, determining 912 the number $<r>$ of VNFCI that are to be allocated, where $<N>+<M>$ is the cardinality of the VNFCI and $<i>$ is the number of VNFCI currently allocated to hosts in the datacentre. The process 900 comprises determining 914 the maximum number $<p>$ of VNFCI that can be added to host Z without breaking the anti-affinity rule (defined by the first number of instances, WA, or the second number of instances, WA', as appropriate). $<y>$ is the number of VNFCI already allocated to host Z. Host Z has enough capacity 916 to host $<q>$ VNFCI. The method 900 comprises calculating 918 parameter $<s>$ and checking 920 whether $<s>$ is greater than zero. If yes, host Z is added 922 to a host list $<K>$ with $<s>$ as the number of VNFCI that can be instantiated on host Z; the list has two columns per entry: host ID and the number of VNFCI that can be instantiated on the host. The method comprises incrementing 924 the current number $<i>$ of VNFCI allocated to host Z by the calculated parameter $<s>$ and checking 926 whether $<i>=<N>+<M>$. If yes 930, host list $<K>$ is returned, and if no 928, the method determines that there are no more hosts in the network/datacentre. Only host with q>0 have room to allocate a VM. If all host have q=0 the process stops.

In the above described methods 500, 700 (starting for the first one with WA, when normal allocation is tried) a search is performed according to the process 900 among all hosts for a host that has the requested resources available and that does not violate Anti-Affinity rules. As soon as a host is found, the process is terminated. If no host is found, the search is repeated (again among all hosts) relaxing Anti-Affinity rules, by using WA' for the VM allocation.

In an embodiment, the method 700 may be modified for the case of manual allocation of a new VM or manual migration of a VM on a specific host. In these cases the host where to which the new VM is to be allocated or to which an existing VM is to be migrated indicated in the command and there is no need for a search, according to the process 900 described above, to be carried out for a host during attempting allocation/migration.

In case a command for Allocation of a new VM or for Migration of a VM fails due to Anti-Affinity rules violation on the host selected by the command the method comprises the following according to the reason for the failure:

1. Check 530 if a parameter "Allocation-without AA", in the case of an initial deployment or scale out, or "Migration-without AA", in the case of normal migration or urgent migration, is enabled; if so continue, otherwise exit (No Allocation/Migration performed).

2. Answer to the command indicating that the command violated the Anti-Affinity rules and ask for next step:
   a. Command terminated with error.
   b. Command forced to be accepted.
   c. Search for another host not violating AA rules and if one is found allocate/migrate the VM to that host.
   d. First search for a host not violating AA rules. If one is found allocate/migrate the VM to that host. If not, search for a host violating AA rules.
   e. Search and propose for allocation/migration other hosts not violating AA rules, if there are none, suggest hosts with minimum violation of AA.

3. Wait for Operator selection, if operator select:
   a. Go to 4
   b. Go to 5
   c. Go to 6
   d. Go to 8
   e. Go to 10

4. The command is rejected without any allocation/migration, exit.

5. The command continues forcing violation of AA rules, if it is executed (no other reason to avoid command execution) go to 752, otherwise exit (command rejected for other reason).

6. Use the normal algorithm to find a host where allocate/migrate the VM without violating the AA, if it is found the VM is allocated/migrated and the command terminates with success, exit.

7. If no host can be found that does not violate AA, answer the command advising that the command violated the Anti-Affinity rules on all hosts and ask for next step:
   a. Command terminated with error
   b. (not selectable)
   c. (not selectable)
   d. Apply Adaptive Allocation to find an host where allocate/migrate the VM
   e. Search and propose for allocation/migration hosts with minimum violation of AA (for Adaptive Allocation)
   At end, go to step 3.

8. If not just done, use the normal algorithm to find an host where allocate/migrate the VM without violating the AA, if it is found the VM is allocated/migrated and the command terminates with success, exit.

9. If no host can be found that does not violate AA, use the method 700 to find a host to allocate/migrate the VM to with minimum AA rule violation, continue with 2, in above method 700.

10. Search for other hosts not violating AA, if none are found Go to 12. Any hosts that are found are proposed for use; the operator selects one of the proposed hosts or terminates the commands without any allocation/migration.

11. If a host without AA rule violation found, if the operator selects to terminate the command Go to 4. Otherwise perform allocation/migration on the selected host (without AA violation rule), exit.

12. Search using the above method 700 for the most suitable hosts. Any suitable hosts found are proposed for use with an indication of a type of AA violation; the operator has to select one of the proposed hosts or to terminate the commands without any allocation/migration. If no host has been found Go to 4.

13. If a host with AA rule violation is found, if the operator selects to terminate the command Go to 4. Otherwise perform allocation/migration on the selected host using the above method 700.

14. The command continues, forcing an AA rule violation on the selected host, if it is executed (no other reason to avoid command execution) go to 4 in method 700, otherwise exit (command rejected for other reason).

In a further embodiment, when one or more hosts requires a maintenance activity they will get rid of their allocated VMs using the above method 500 for migration. In order to free more hosts at the same time, without having a deadlock where VMs are migrating among them, the group of hosts are put in an "Isolating" state until the end of the maintenance activity; in this state VMs allocated to a host can continue to work, but the host cannot be used as a destination for any new allocation or migration of VMs. As soon as any VMs that have already been allocated are all migrated to other hosts, the maintenance activity can start. At the end of the maintenance activity the hosts are removed from the isolating state and VMs can be allocated to them.

Considering a VNF that must be deployed in a datacentre that does not have the required hosts requested by Anti-Affinity rules. To perform the deployment one must wait until new hosts are added to the datacentre. In case the deployment is urgent, the method 700 may be used to enable the deployment, temporarily violating the Anti-Affinity rule, and moving the VMs violating the rules to new hosts as soon as they are available.

Considering a VNF of N+1 VMs belonging to the same Anti-Affinity group, the communications network, for example datacentre, should have at least N+1 hosts available to locate VMs. To reduce costs it may be decided not to add other hosts in case they are needed only for very short periods, and in any case to wait until additional hosts are really needed before buying them. The method 700 may enable short term scale out, as soon as it is required, with new allocation of new VMs done temporarily violating the Anti-Affinity rule, and then moving the VMs violating the rules to new hosts as soon as they are available.

Migration may be planned, for example as part of a planned maintenance action, or may be urgent, for example in response to a host experiencing problems or expected to experience problems soon. The main case where migration is performed is when one or more hosts need a maintenance intervention. Normally this intervention is not related to a single host but to many or all hosts. So it can happen that more hosts (in the worst case all the hosts) need to get rid of their allocated VMs at same time. Since the VMs should continue to work during host maintenance activity, it is not possible that all hosts can get rid of their VMs at same time, the simplest solution is to do one host a time, but this can require too much time for a datacentre to have a complete HW update. A possible compromise is done freeing groups of hosts at a time. The larger the group, the faster is the total maintenance activity on the datacentre. Of course the size of the group depends also on the capability of the other hosts to allocate the VMs to be migrated without violating Affinity and Anti-Affinity rules.

Figure 10:
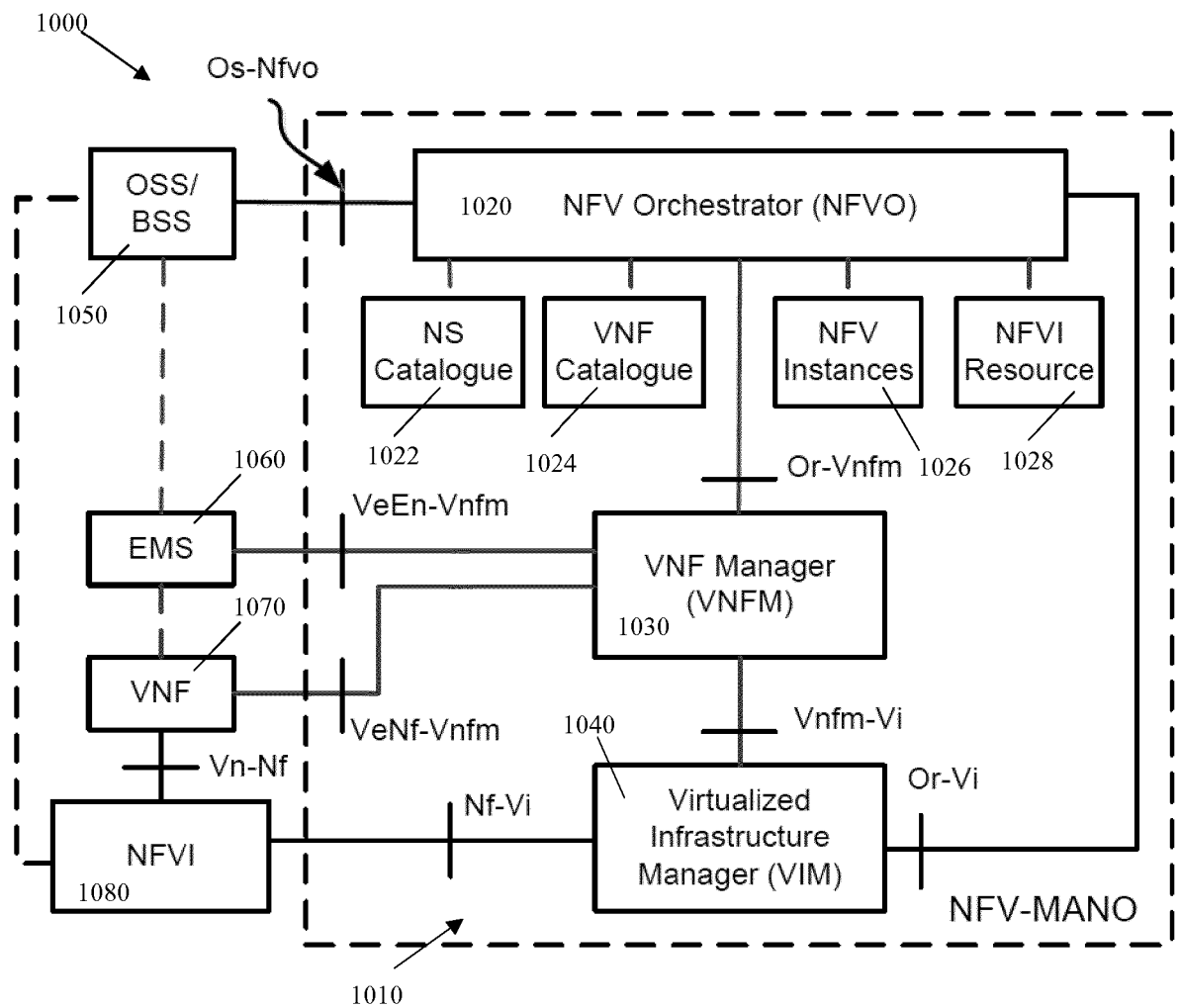
FIG. 10 shows a schematic view of NFV management entities including communications network management apparatus according to an embodiment of the invention.

FIG. 10 shows a schematic view of other entities involved in an example of management of VNFs and their relationships with communications network management apparatus 1030 according to an embodiment of the invention. In this embodiment the communication network management apparatus is a VNF manager 1030. The VNF manager 1030 is one part of an NFV Management and Operations, NFV-MANO, 1010 and can be configured to carry out the allocation of instances to hosts according to the embodiments as described above in relation to FIGS. 1 to 9. The allocation may be prompted based on a request received from an OSS/BSS 1050, or from another part of the NFV-MANO. The OSS/BSS can be a conventional operational support system and business support system. The NFV-MANO can be for governing service orchestration, automation and administration. It can have access to stored descriptions of services, of VNFs, and of infrastructure. In this case the entities are based on the published ETSI NFV standard. Coupled to the OSS/BSS there is an element management system EMS 1060. This manages elements used in carrying the traffic across the network and makes use of a number of virtual network functions 1070. These may make use of Network functions virtualization infrastructure NFVI 1080. The NFVI can have virtual compute parts, virtual storage parts and virtual network parts and a virtualization layer, on physical computer hardware, physical storage hardware and physical network hardware. The NFV-MANO 1010 comprises an NFV orchestrator, NFVO, 1020, one or more VNF managers 1030 and a virtualized infrastructure manager VIM 1040 coupled to the VNF managers and to the instances.

There is an interface called reference point Os-Ma (not shown) between the OSS/BSS, and the NFV-MANO 1010. There is an interface called reference point VeEn-Vnfm between on the one side the EMS 1060 and VNF 1030, and on the other side, the VNF manager 1030. An interface called reference point Or-Vi is provided between the orchestrator 1020 and VIM 1040. An interface called reference point Or-Vi is provided between the orchestrator 1020 and VIM 1040. An execution reference point Vn-Nf is shown between the VNF 1070 and the NFVI 1080. An interface called reference point Or-Vnfm is provided between the orchestrator 1020 and VNF manager 1030. An interface called reference point Vnfm-Vi is provided between the VIM 1040 and the VNF manager 1030. These interfaces and the functions of the different entities follow the arrangement known from the ETSI NFV standard in this example, though the features of the embodiments will also work in other virtualization management arrangements.

Figure 11:
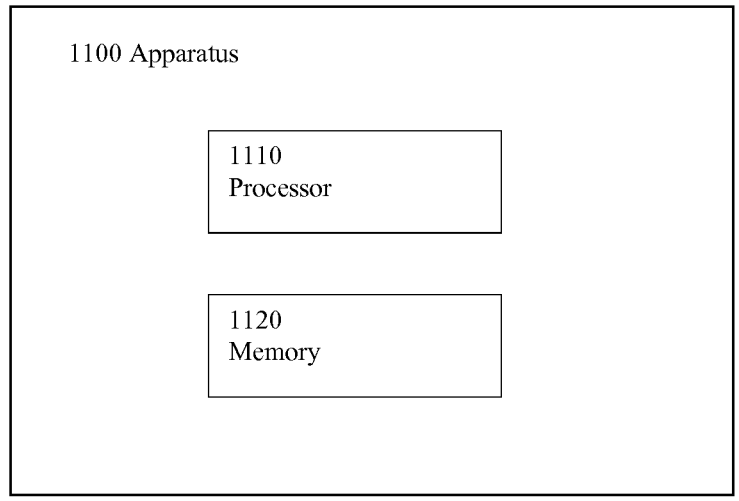
FIG. 11 shows a schematic view of communications network management apparatus having modules according to an embodiment of the invention.

Communications network management apparatus 1100 according to an embodiment of the invention is illustrated in FIG. 11. The apparatus 1100 comprises a processor 1110 and a memory 1120. The memory contains instructions executable by the processor, whereby the apparatus is operative to:

receive a request to allocate an instance of a virtual network function component, VNFC, to a host, the instance belonging to an anti-affinity group, AAG, of instances;

attempt allocation of the instance; and if allocation of the instance fails because for each host considered for allocation of the instance a first number of instances, WA, belonging to the AAG that are allocable to a single host would be exceeded by allocation of the instance to the host:

i. assign to the instance a second number of instances, WA', belonging to the AAG that are allocable to a single host, wherein WA' is greater than WA;

ii. reattempt allocation of the instance; and iii. following successful allocation, if sufficient capacity for the instance subsequently becomes available on another host and if the WA of the instance would not be exceeded by allocation of the instance to the other host, migrate the instance to the other host; or iv. following unsuccessful allocation, if there is sufficient capacity for the instance available on at least one host, increase WA' of the instance and again reattempt allocation.

In further embodiments, the memory contains instructions executable by the processor, whereby the apparatus is operative to implement the methods according to the embodiments described above in relation to FIGS. 1 to 9.

Figure 12:
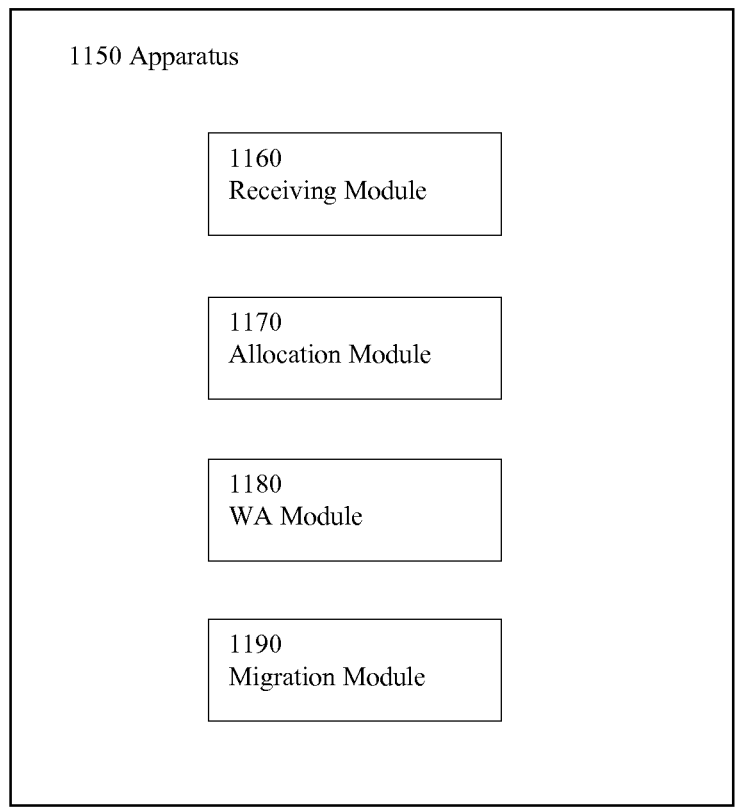
FIG. 12 shows a schematic view of communications network management apparatus according to an embodiment of the invention.

A further aspect of the invention provides communications network management apparatus 1150 according to an embodiment of the invention, as illustrated in FIG. 12. The communications network management apparatus 1150 comprises:

a receiving module 1160 for receiving a request to allocate an instance of a virtual network function component, VNFC, to a host, the instance belonging to an anti-affinity group, AAG, of instances;

an allocation module 1170 for attempting allocation of the instance to a host;

a WA module 1180 for assigning to the instance a second number of instances, WA', belonging to the AAG that are allocable to a single host if allocation of the instance fails because for each host considered for allocation of the instance a first number of instances, WA, belonging to the AAG that are allocable to a single host would be exceeded by allocation of the instance to the host; and a migration module 1190 for migrating the instance to another host if sufficient capacity for the instance subsequently becomes available on another host and if the WA of the instance would not be exceeded by allocation of the instance to the other host. The migration module is for migrating the instance to the other host following successful allocation of the instance. The WA module is additionally for increasing WA' of the instance if allocation is unsuccessful, if there is sufficient capacity for the instance available on at least one other host, and then recommencing at reattempting allocation. The allocation module is additionally for reattempting allocation of the instance to a host after increasing WA' of the instance by the WA module. The second number of instances, WA', is greater than the first number of instances, WA.

FIGS. 13 to 19 illustrate a datacentre 1200 being operated according to the method 500 described above with reference to FIGS. 5 and 6. The datacentre 1200 may include communications network management apparatus 110, 1030, 1100, 1150 as described above with reference to any of FIGS. 1 and 10 to 12.

Unsuccessful evacuation is very probable in small datacentres due to either the VNF deployment done according to Anti-affinity rules or lack of available hardware hosts; generally the lack of hardware resources is a temporary problem that requires manual intervention on both hardware and software to optimize their allocation. Moreover also medium or big datacentres in case of disaster (failure of multiple hosts at the same time) can have temporary lack of resources. Unsuccessful evacuation can result in reduction of redundancy, or complete loss for those systems with 1:1 protection scheme (N=1, M=1).

Unsuccessful evacuation can result in a reduction of redundancy and loss of capacity for N+M active-active systems protection scheme as instances evacuated will not be Instantiated. Generally, cloud execution environments take between 30 s and 1 minute to automatically start the evacuation process. If the evacuation fails, it means that the availability of the VNF will be affected until the problem in the cloud infrastructure is solved. If meantime other unpredictable spontaneous faults happen, it could lead to the complete outage of the service. If we compare this with availability of telco grade applications, that is at least 99.999 which means an unavailability of less than 5.26 minutes per year, this can be considered a problem.

Successful evacuation will reinstate a replacement VM faster by using available resources that matches the criteria requested by the application. This increases recovery speed of the VM that has experienced the unplanned downtime by not waiting for lengthy recovery or repair procedures.

Figure 13:
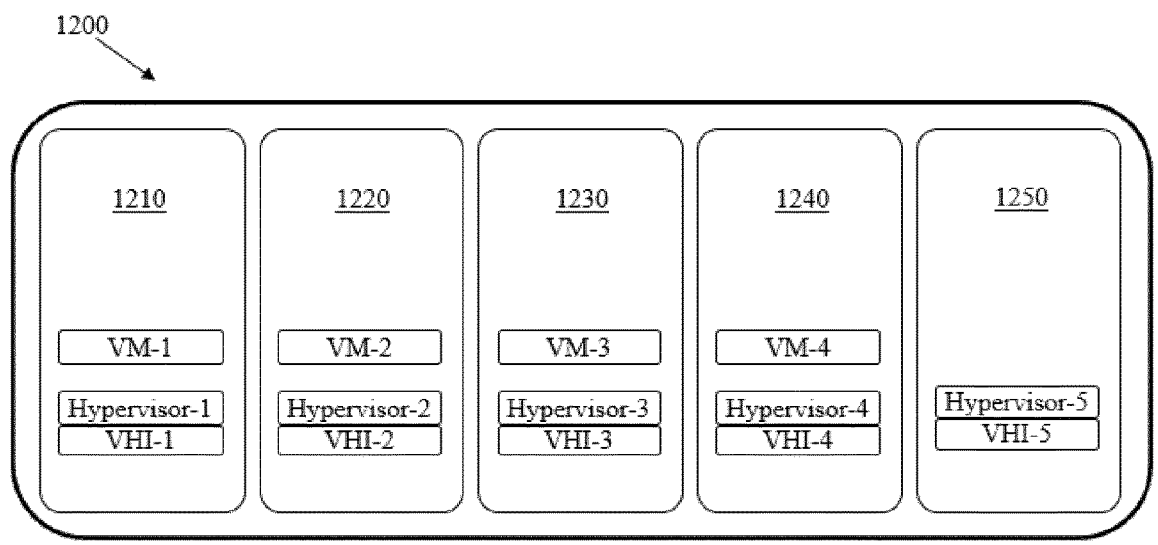
FIGS. 13 to 21 show a data centre operated according to a method according to embodiments of the invention of managing a communications network.

FIG. 13 shows a simple datacentre 1200 with 5 hosts 1210, 1220, 1230, 1240, 1250 available for VMs, and a VNF composed of 4 VMs, VM-1, VM-2, VM-3, VM-4 (a 3+1 active-active redundant system) all belonging to the same Anti-Affinity Group, AAG. Each VM is run by a respective hypervisor on a respective host, via a Virtual Execution Environment, VEE, host interface, VHI.

Figure 14:
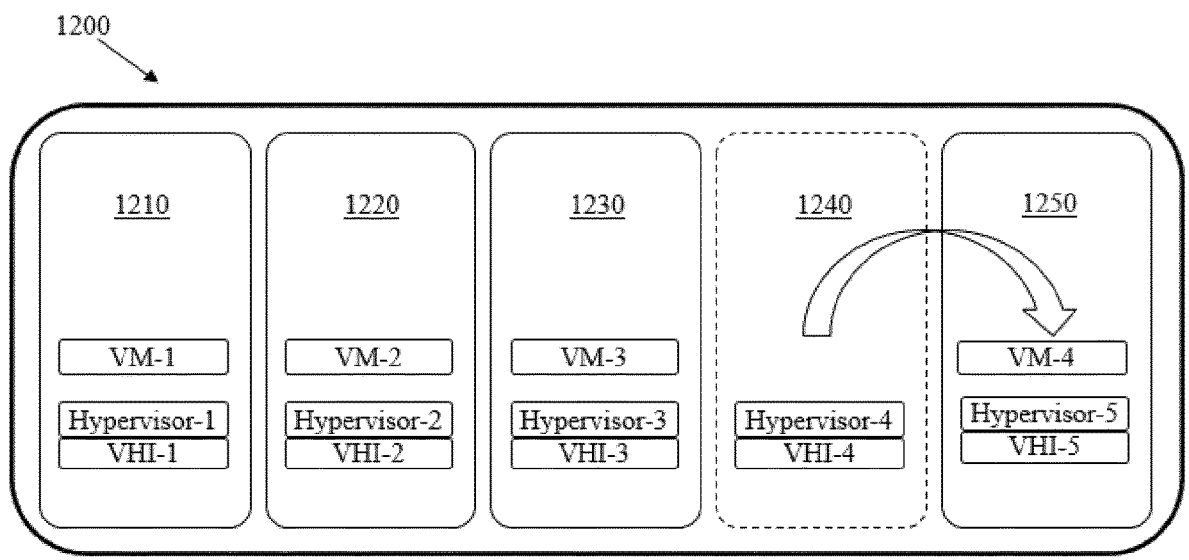

As illustrated in FIG. 14, if there is a fault on a host, for example host-4 1240, and there is a free host 1250, which does not have any other VMs in the same AAG allocated to it, VM-4 is evacuated to host-5 1250.

Figure 15:
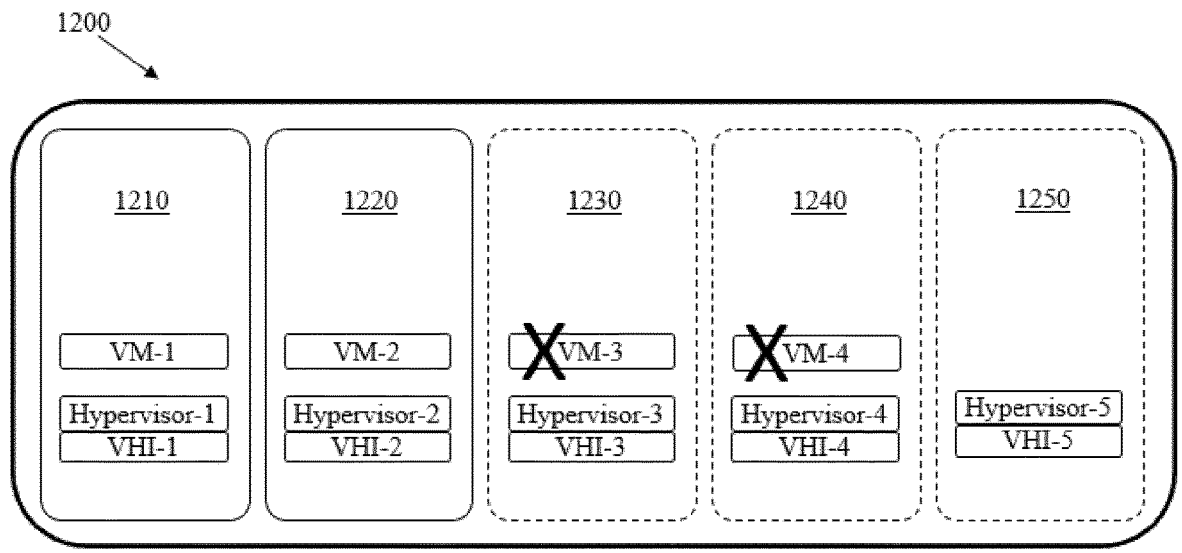

As illustrated in FIG. 15, if there isn't a free host, or in the case of disaster where more than one host fails at the same time, it is possible that following Anti-Affinity rules evacuation cannot be performed. In this case WA=1 and no temporary violation of the AA rule is permitted, so VM-3 and VM-4 cannot be allocated to one of the available hosts 1210, 1220. The VMs located on the faulty hosts 1230, 1240 will not work until these hosts are restored.

Figure 16:
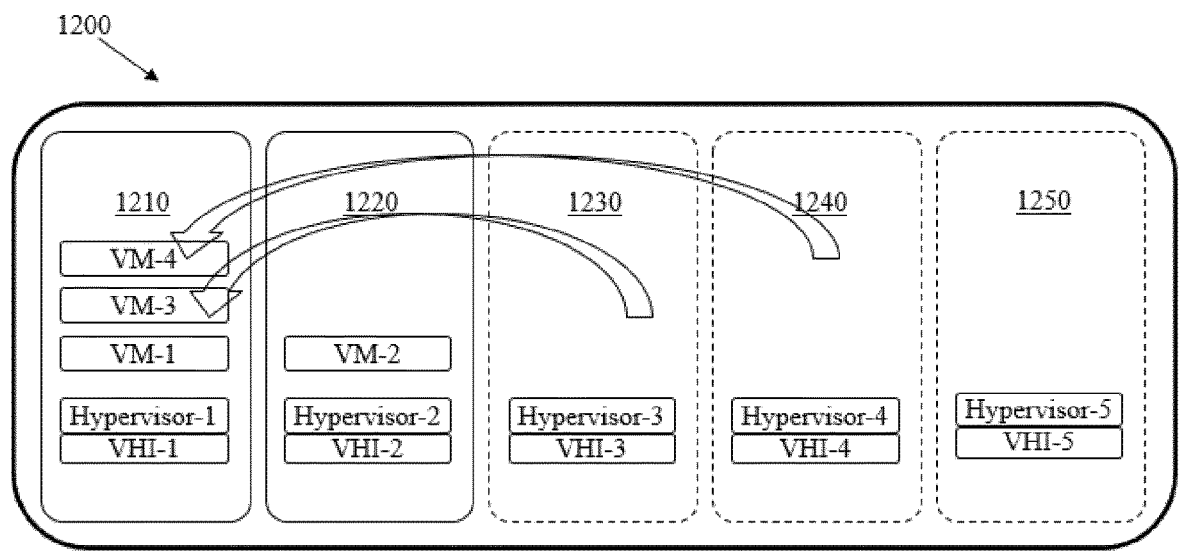

FIG. 16 illustrates what might occur if free violation of AA rules is permitted when evacuation is required from more than one host; VM-3 and VM-4 are both allocated to host-1 1210. This is not desirable since the majority of the VMs are now allocated to host-1, and if this host fails three VMs will be at risk. Free AA violation also means that even when the failed hosts 1230, 1240, 1250 are restored, the VMs do need to be migrated back, so there is an ongoing risk that a large number of VMs may not work if just one host fails.

Figure 17:
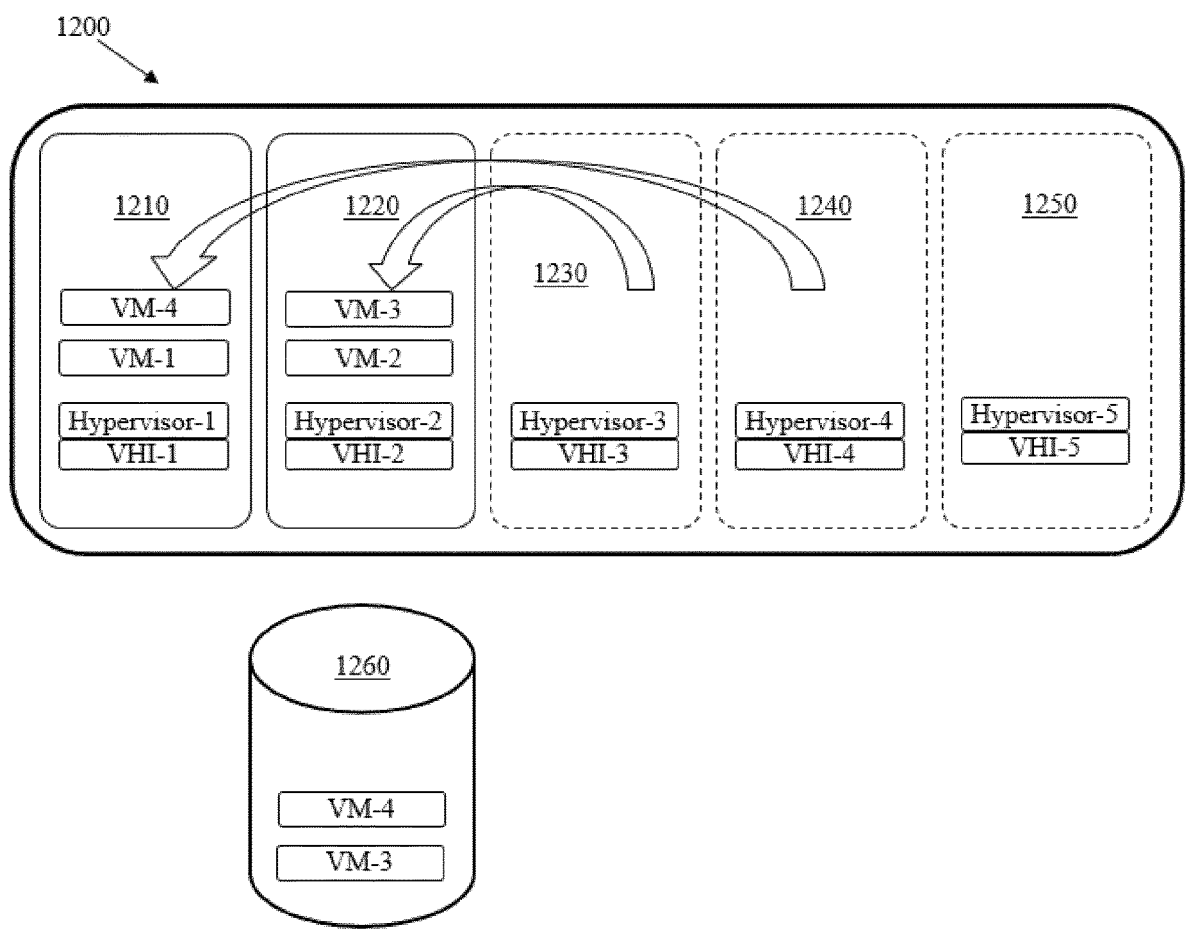

FIG. 17 illustrates a response to the situation in FIG. 15 by applying the method 500 described above with reference to FIGS. 5 and 6. In this case, VM-3 may be allocated to host-2 as its temporary host and VM-4 may be allocated to host-1 as its temporary host, in violation of the AA rules. This is achieved by assigning WA' to each of VM-3 and VM-4 and increasing WA' for each of VM-3 and VM-4 so it is greater than WA (WA'=2 as compared to WA=1). It should be noted that WA' is assigned to each of VM-3 and VM-4, and each WA' increased, without requiring any change to WA for the rest of the virtual machines, VM-1 and VM-2, belonging to the AAG.

Information identifying VM-3 and VM-4, their WA and their current WA' are stored in a list 1260.

The arrangement of VMs shown in FIG. 17 is preferable to that shown in FIG. 16 because it provides the maximum possible spread of VMs across the working, available hosts; with free AA violation, it cannot be guaranteed that the VMs that need to be evacuated will be shared among the working, available hosts.

Figure 18:
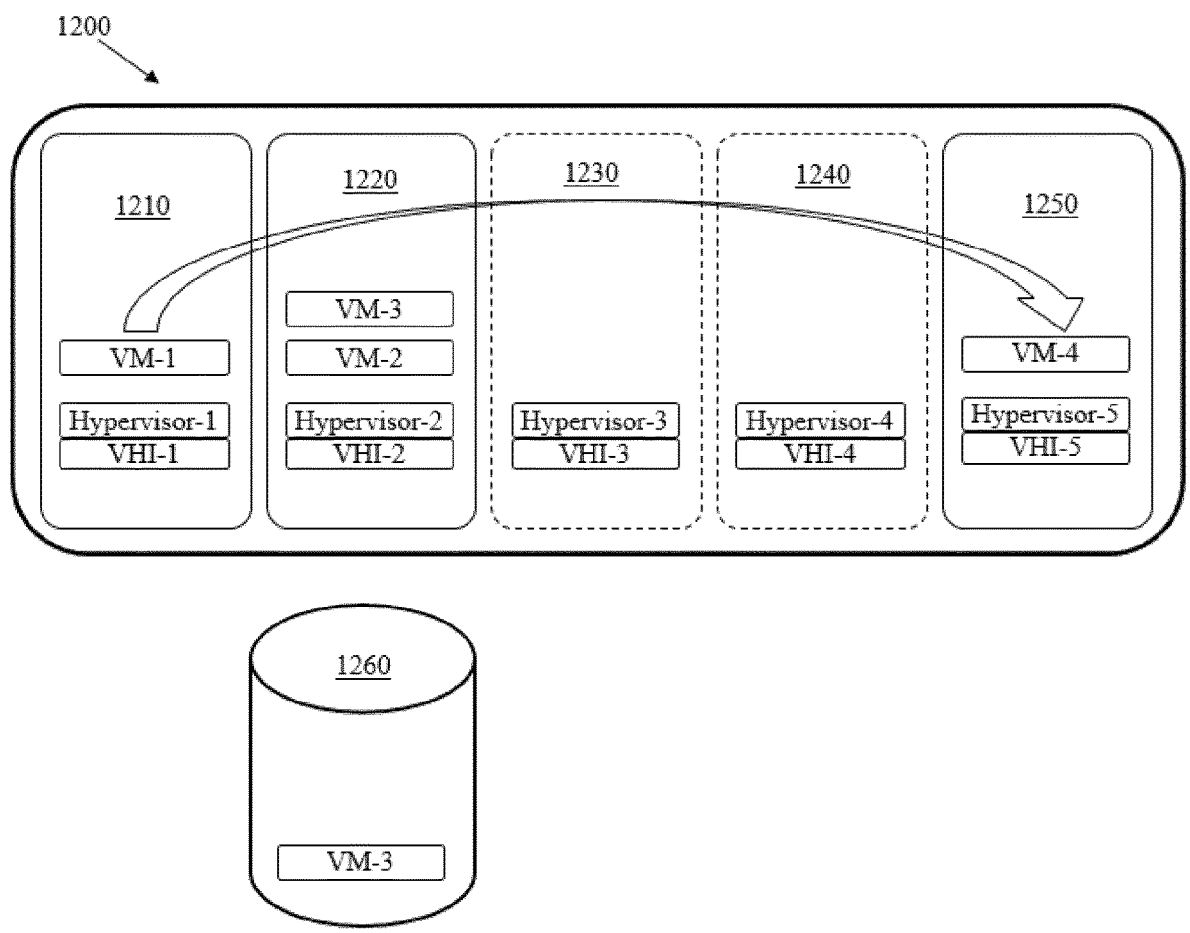

As illustrated in FIG. 18, when the failure of host-5 is fixed, so host-5 1250 becomes available, VM-4 in the list 1260 is migrated to host-5. VM-4 is removed from the list 1260 and is returned to its stored WA, WA=1. Similarly, as illustrated in FIG. 19, when host-4 again becomes available, VM-3 in the list 1260 is migrated to host-4 and the WA of VM-3 is returned to stored value, WA=1. Host-3 remains unavailable and so VMs cannot be allocated to it or migrated to it.

FIGS. 13 to 19 may also be referred to in order to illustrate a data centre being operated according to the method 700 described above with reference to FIGS. 7 and 8.

As illustrated in FIG. 14, if there is an update required to a host or a host requires urgent migration (for example, when a known problem is expected to cause host failure within a short time), for example host-4 1240, and there is a free host 1250, which does not have any other VMs in the same AAG allocated to it, VM-4 is migrated host-5 1250.

If, as illustrated in FIG. 15, there isn't a free host, more than one host requires an urgent update or migration at same time, it is possible that following Anti-Affinity rules migration cannot be done. This can mean that the communication network/datacentre cannot be updated and the VMs cannot be moved in order to have a better allocation. In the worst case, where the host needs an urgent maintenance the VM could be stopped without any replacement, reducing the VNF redundancy or causing a complete VNF failure.

FIG. 16 illustrates what might occur if free violation of AA rules is permitted when an urgent update is required to more than one host; VM-3 and VM-4 are both allocated to host-1 1210. This is not desirable since the majority of the VMs are now allocated to host-1, and if this host fails three VMs will be at risk. Free AA violation also means that even when the hosts 1230, 1240, 1250 being updated are available again, the VMs do need to be migrated back, so there is an ongoing risk that a large number of VMs may not work if just one host requires an urgent update.

FIG. 17 illustrates a response to the situation in FIG. 15 by applying the method 700 described above with reference to FIGS. 7 and 8. In this case, VM-3 may be allocated to host-2 as its temporary host and VM-4 may be allocated to host-1 as its temporary host, in violation of the AA rules. This is achieved by assigning a WA' greater than WA to each of VM-3 and VM-4 (WA'=2 as compared to WA=1). Information identifying VM-3 and VM-4, their WA and their current WA' are stored in a list 1260.

Applying the method 700 of the present invention enables migration to be done immediately, with optimized distribution of new VMs. As soon as new hosts are available VMs violating AA rules are migrated in order to fulfill the AA rules. In case of host failure during the temporary AA violation time the situation should be comparable or better of the one where no AA violation is allowed.

The arrangement of VMs shown in FIG. 17 is preferable to that shown in FIG. 16 because it provides the maximum possible spread of VMs across the working, available hosts; with free AA violation, it cannot be guaranteed that the VMs that need to be urgently migrated will be shared among the working, available hosts.

Figure 19:
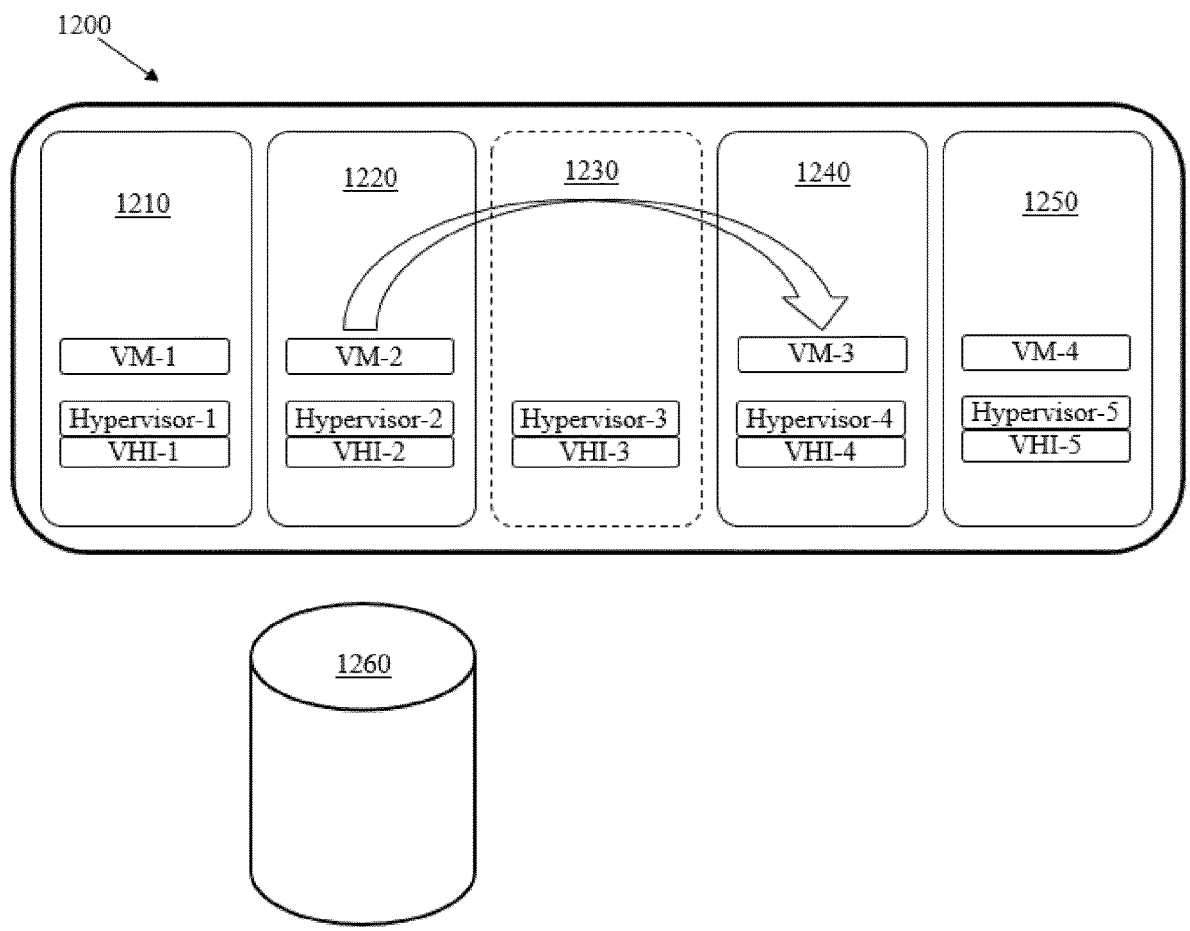

As illustrated in FIG. 18, when the update to host-5 is completed, host-5 1250 becomes available again, VM-4 in the list 1260 is migrated to host-5. VM-4 is removed from the list 1260 and VM-4 is returned to its stored WA, WA=1. Similarly, as illustrated in FIG. 19, when the update to host-4 is completed and it becomes available again, VM-3 in the list 1260 is migrated to host-4 and VM-3 is returned to its stored value, WA=1. Host-3 is still being updated and so VMs cannot be allocated to it or migrated to it.

The method 700 may be applied to enable migration for planned maintenance when there are not enough hosts in the communications network. In this case there is a need to temporarily free the hosts to perform the planned maintenance, after the maintenance the host is available again to allocate VMs. To avoid AA problems in this case, the communications network may be provisioned with more HW than needed in normal use, but this will increase the CAPEX for the communications network. Applying the method 700 of the present invention means maintenance can be done immediately without requiring additional hardware and the capability of VNF is maintained so users do not suffer any deterioration in service. The planned maintenance may, for example, be due to Firmware update or HW change.

The method 700 may be applied to enable migration for redistribution of VMs when there are not enough hosts in the communications network. In this case there is a need to move VMs in order to better redistribute them inside the datacentre/communications network. Using the method 700 of the present invention may enable VMs to be redistributed inside the communications network can be done immediately without requiring additional hardware and the capability of VNF is maintained so users do not suffer any deterioration in service. VMs redistribution can be necessary when new VNFs have to be allocated in addition to those already allocated while ensuring the Affinity and Anti-Affinity rules are complied with for all VNFs. VMs redistribution can be performed also to save power and shutdown hosts that are not needed.

The method 700 may be applied to enable urgent migration from a host when there are not enough hosts in the communications network. In this case there is the need to move immediately all VMs allocated on one or more hosts that are suffering or expected to suffer problems. Applying the method 700 of the present invention may enable VMs to be redistributed within the communications network immediately without requiring additional hardware and the capability of VNF is maintained so users do not suffer any deterioration in service. Urgent migration may be required when a known problem will cause a host failure in a short time. In this case if the migration is not performed the VMs will be shutdown (migration will likely become evacuation) causing problems to the VNFs, that will lose capability and serviceability, and in the worst case there can be a complete VNF failure.

The method 700 may be applied to enable rolling update all the hosts in a communications network, when only a few spare hosts are available. In this case there is the need to temporarily free all the hosts in order to make a maintenance intervention that could be normal or urgent. If there are only few spare hosts available, it can happen that only one or very few hosts can get rid of VMs at same time, so that the maintenance operation will take a long time. Typically maintenance must be completed and the host be available before maintenance of the next host can start. Using the method 700 of the present invention may enable temporary violation of AA rules, in order to free more hosts at the same time, making the rolling update faster, without requiring too many spare hosts and so saving CAPEX. A rolling update is normally done in a time period when there is not much load on a communications network/datacentre and on the allocated VMs.

The method 700 may be used when there is a need to deploy a new VNF on a datacentre where there is not enough hosts available to comply with Anti-Affinity rules. This situation is similar to the migration one when more hosts need to be updated urgently at same time (disaster), the same figures can be used where the hosts under maintenance have to be considered as hosts missing waiting for inclusion in the datacentre.

Using the method 700 may enable a VNF to be completely deployed immediately with optimized distribution of all VMs. As soon as new hosts will be available VMs violating AA rules are migrated in order to comply with the AA rules. In case of host failure during the temporary AA violation time the situation will be comparable or better of the one where no AA violation is allowed.

Using the method 700 may enable a new VNF to be deployed urgently when there are not enough hosts in the communications network/datacentre. In this case there is a need to deploy immediately a VNF on a datacentre, but the datacentre does not have the number of hosts needed to be compliant with AA rules. The urgency can be due to a disaster, but also to an event or a new condition that move users or request for services to a datacentre not yet able to allocate new VNF complying with the Anti-Affinity rules. The time required to update the datacentre with new HW, could be too long, so that the VNF is no longer needed when the datacentre is updated.

Using the method 700 may enable a new trial VNF to be deployed when there are not enough hosts in the communications network/datacentre. In this case there is the need to deploy a trial VNF on a datacentre, but the datacentre does not have the number of hosts needed to be compliant with AA rules. The fact that the VNF is a trial means that it could be removed after short time or that it may be scaled in after the trial. During a trial normally it is not requested to strictly follow the Anti-Affinity rules, on the other hand before to buy new HW it is better to verify if it is really needed, so the datacentre should be updated only at the end of trial period.

Using the method 700 may enable scale out of a communications network/datacentre, i.e. adding new VMs to an existing VNF on a datacentre there are not enough hosts in the communications network/datacentre to comply with the Anti-Affinity rules for new VMs. The situation is similar to a partial first deployment due to missing hosts. Using the method 700 of the present invention may enable the scale out to be done immediately, with optimized distribution of new VMs. As soon as new hosts become available VMs violating AA rules are migrated in order to comply with the AA rules. In case of host failure during the temporary AA violation time the situation will be comparable or better of the one where no AA violation is allowed.

Using the method 700 may enable an unexpected scale out of a communications network/datacentre. The method 700 may enable the datacentre to be updated only when really needed, this saving CAPEX. The capability of VNF is maintained so users do not suffer any deterioration in service. An unexpected scale out could be due to a disaster, but also to an event or a new condition that move uses or increase request for services to a datacentre not yet able to allocate new VMs complying with the Anti-Affinity rules.

Using the method 700 may enable a short temporary scale out when there is the need to do a scale out only for a short period, and after that period the new VMs will be removed. A temporary scale may be needed for events like sport matches, concerts and similar that last only few hours.

Figure 20:
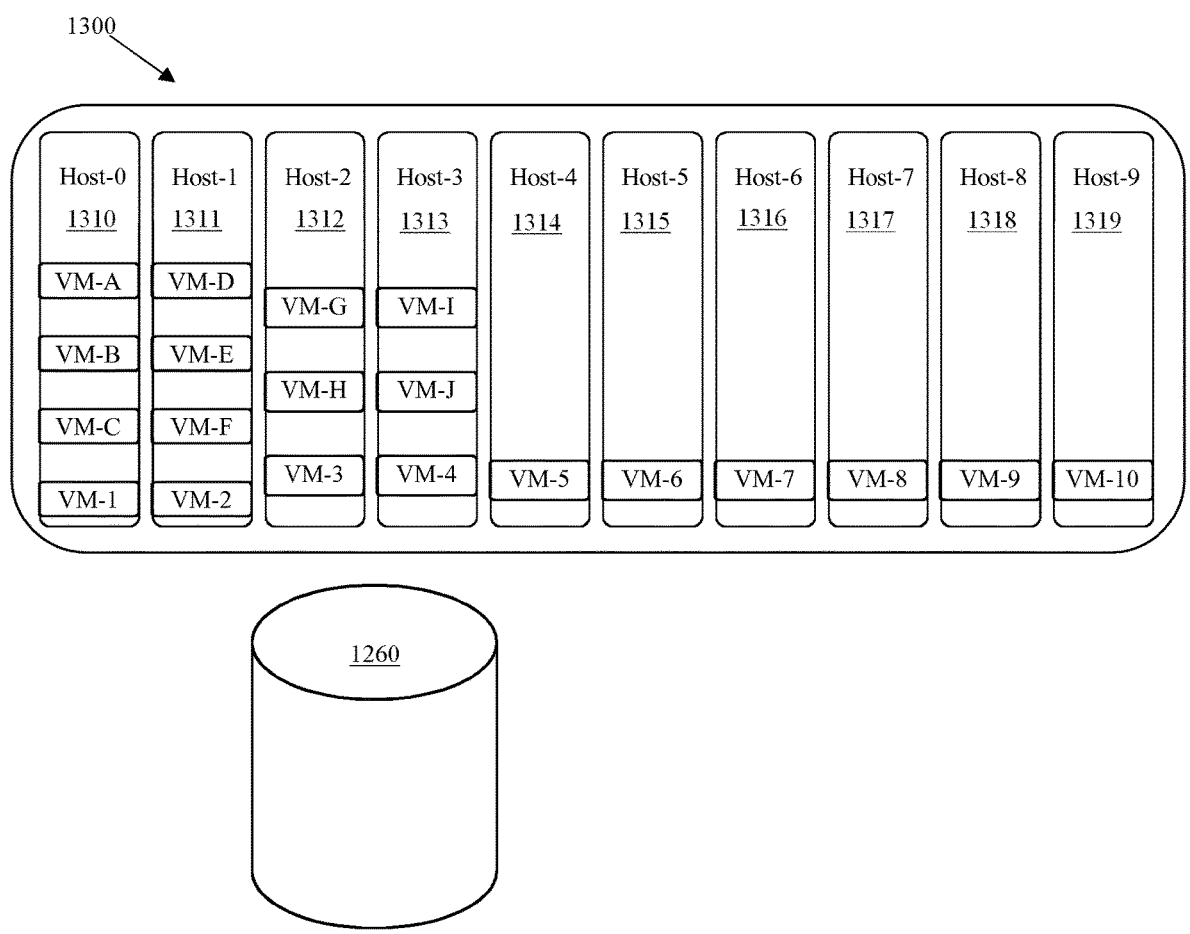
Figure 21:
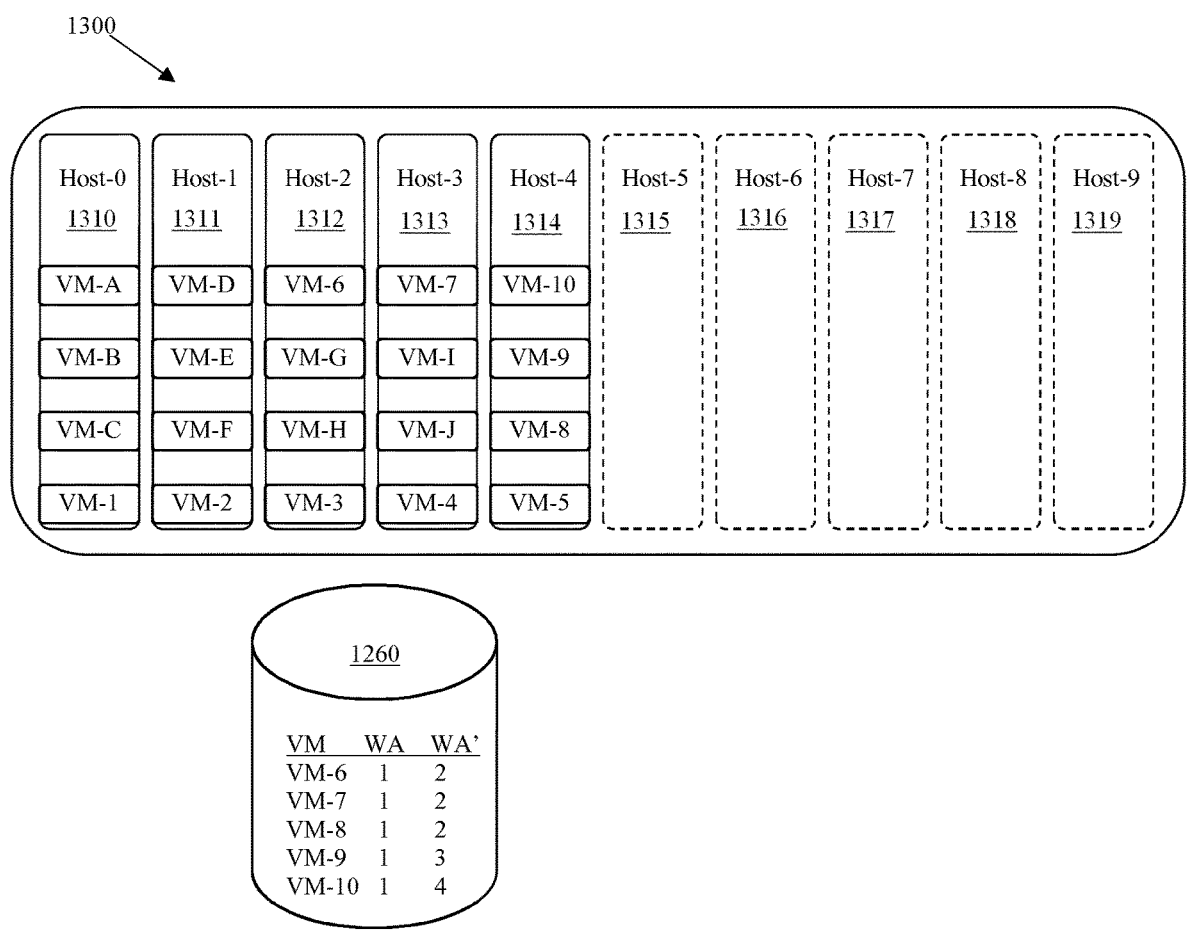

FIGS. 20 and 21 illustrate a datacentre 1300 being operated according to the method 500 described above with reference to FIGS. 5 and 6. The datacentre 1300 may include communications network management apparatus 110, 1030, 1100, 1150 as described above with reference to any of FIGS. 1 and 10 to 12.

In this example, a group of 10 VMs belonging to the same AAG are provided, one VM is allocated to each host, i.e. WA=1. It will be understood that WA=1 applies only to VM in this AAG, other VMs (VM-A to VM-J) belonging to other AAGs are also present and have been allocated to hosts 0 to 3. Normal allocation of the VMs, with no AA violation, is shown in FIG. 20.

If one of the hosts fails and the VMs allocated on it must be evacuated, the VM belonging to the AAG of 10 VMs cannot be allocated to the other hosts because there is already a VM belonging to that AAG allocated to each host. So even if three of the host were to have sufficient capacity for the VM requiring evacuation, the evacuation fails.

Applying the method 500 of the present invention, WA'=WA is assigned to the VM to be evacuated and is then increased by 1, so WA'=WA'+1=2. Evacuation is then reattempted for all of the hosts, although for the hosts without sufficient capacity for the VM it is meaningless.

If, for example, it is necessary to evacuate 5 VMs from 5 failed hosts, host-5 1315 to host-9 1319 in FIG. 21, but 2 of the remaining hosts, being host-0 1310 and host-1 1311, do not have sufficient capacity for another VM and another 2 hosts, host-2 1312 and host-3 1313, only have sufficient capacity for 1 further VM. The evacuation can proceed according to the method 500 as follows.

Evacuation of VM-6 is attempted but fails because each of available hosts with sufficient capacity, host-2, host-3 and host-4 1314, already has a VM with the same AAG allocated, remembering that WA=1. VM-6 then has WA'=WA assigned to it and WA' is increased by 1, WA'=WA'+1=2. Evacuation is then reattempted and is successful to host-2. Host-2 now no longer has sufficient capacity available for another VM. The identity of VM-6 is stored in a list 1260, together with WA and its current WA'.

Evacuation of VM-7 is attempted but fails because each of available hosts with sufficient capacity, host-3 and host-4, already has a VM with the same AAG allocated, remembering that WA=1. VM-7 then has WA'=WA assigned to it and WA' is increased by 1, WA'=WA'+1=2. Evacuation is then reattempted and is successful to host-3. Host-3 now no longer has sufficient capacity available for another VM. The identity of VM-7 is stored in a list 1260, together with WA and its current WA'.

Evacuation of VM-8 is attempted but fails because the remaining available host with sufficient capacity, host-4, already has a VM with the same AAG allocated, remembering that WA=1. VM-8 then has WA'=WA assigned to it and WA' is increased by 1, WA'=WA'+1=2. Evacuation is then reattempted and is successful to host-4. The identity of VM-8 is stored in a list 1260, together with WA and its current WA'.

Evacuation of VM-9 is attempted but fails because the remaining available host with sufficient capacity, host-4, already has two VMs with the same AAG allocated, remembering that WA=1. VM-9 then has WA'=WA assigned to it and WA' is increased by 1, WA'=WA'+1=2. Evacuation is then reattempted and again fails, because allocating VM-9 to host-4 would result in 3 VMs on host-4 and WA'=2. WA' is further increased by 1, WA'=WA'+1=3. Evacuation is then reattempted and is successful to host-4. The identity of VM-9 is stored in a list 1260, together with WA and its current WA'.

Evacuation of VM-10 is attempted but fails because the remaining available host with sufficient capacity, host-4, already has three VMs with the same AAG allocated, remembering that WA=1. VM-10 then has WA'=WA assigned to it and WA' is increased by 1, WA'=WA'+1=2. Evacuation is then reattempted and again fails, because allocating VM-10 to host-4 would result in 4 VMs on host-4 and WA'=2. WA' is further increased by 1, WA'=WA'+1=3. Evacuation is then reattempted and again fails, because allocating VM-10 would result in 4 VMs on host-4 and WA'=3. WA' is further increased by 1, WA'=WA'+1=4. Evacuation is then reattempted and is successful to host-4. The identity of VM-10 is stored in a list 1260, together with WA and its current WA'.

In this embodiment, it is again noted that WA' is assigned to each VM requiring evacuation, VM-5 to VM-9, without requiring any change to WA for the rest of the virtual machines, VM-1 to VM-4, belonging to the AAG. It should also be noted that each WA' is respectively increased, without requiring an increase to WA' of any of the other VMs being evacuated, i.e. the other VMs that also have a WA' assigned to them.

When the failed hosts return to being available, or a new host is be, meaning that sufficient capacity for at least one has become available on another host to the ones that are currently, temporarily hosting the VMs that required evacuation, migration of the VMs in the list 1260 begins. The first VM to migrate is the one with the highest stored current WA', i.e. with the highest AA violation (WA'-WA). This is VM-10, which has an AA violation of 3 (WA'-WA=4-1=3). After VM-10 is migrated, the VM with the next highest AA violation is VM-9, that has an AA violation of 2 (WA'-WA=3-1=2). So, VM-9 is migrated next. VM-6, VM-7 and VM-8 have the same AA violation (WA'-WA=2-1=1) so these VMs can be migrated in any order.

It will be appreciated that the datacentre 1300 illustrated in FIGS. 20 and 21 may also be operated according to the method 700 described above with reference to FIGS. 7 and 8, migration and allocation during first deployment or scale out being performed instead of evacuation.

A further embodiment provides a computer program, comprising instructions which, when executed on at least one processor, cause the at least one processor to carry out any of the above steps of the method of managing a communications network comprising a plurality of hosts by allocating instances of virtual network function components to hosts.

A further embodiment provides a carrier containing a computer program, comprising instructions which, when executed on at least one processor, cause the at least one processor to carry out any of the above steps of the method of managing a communications network comprising a plurality of hosts by allocating instances of virtual network function components to hosts.

The invention claimed is:

1. A method of managing a communications network comprising a plurality of hosts by allocating instances of virtual network function components to hosts, the method comprising acts of:
   receiving a request for allocation of an instance of a virtual network function component, VNFC, to a host, the instance belonging to an anti-affinity group, AAG, of instances, wherein the AAG indicates that the maximum number of instances allocable to a single host is a first number of instances, WA;
   attempting allocation of the instance to each host; and
   if allocation of the instance fails because for each host considered for allocation of the instance the first number of instances, WA, belonging to the AAG that are allocable to a single host would be exceeded by allocation of the instance to the host the method comprises:
   i. assigning to the instance a second number of instances, WA', belonging to the AAG that are allocable to a single host, wherein WA' is greater than WA;
   ii. reattempting allocation of the instance to each host; and
   iii. following successful allocation, if sufficient capacity for the instance subsequently becomes available on another host and if the WA of the instance would not be exceeded by allocation of the instance to the other host, migrating the instance to the other host; or
   iv. following unsuccessful allocation, if there is sufficient capacity for the instance available on at least one host, iteratively increasing WA' of the instance and recommencing at reattempting allocation.

2. A method as claimed in claim 1, wherein the VNFCs are N+M VNFCs, where N is a minimum number of instances of a VNFC required to be available and M is a number of redundancy instances of the VNFC and wherein the N+M instances belong to an AAG of instances.

3. A method as claimed in claim 1, additionally comprising:
   storing an identity of the instance and an indication of the WA of the instance, following successful allocation; and
   stopping using WA' for the instance and returning the instance to the stored WA after migrating the instance to the other host.

4. A method as claimed in claim 1, comprising receiving a plurality of requests relating to a plurality of instances, and wherein migrating is performed according to at least one of magnitude of anti-affinity violation, highest priority first, first-in-first-out and last-in-last-out, when sufficient capacity for at least one instance becomes available.

5. A method as claimed in claim 3, comprising:
   receiving a plurality of requests relating to a plurality of instances, and wherein migrating is performed according to at least one of magnitude of anti-affinity violation, highest priority first, first-in-first-out and last-in-last-out, when sufficient capacity for at least one instance becomes available; and
   storing an indication of a current WA' of the instance and the magnitude of anti-affinity violation of the instance is a difference between WA and the current WA'.

6. A method as claimed in claim 1, wherein the request is received in response to a host to which the instance is initially allocated becoming unavailable due to one of an unplanned event and a planned maintenance action.

7. A method as claimed in claim 1, wherein the allocation is one of evacuation, migration, and allocation of a new instance during one of first deployment of a virtual network function and scale out of an existing virtual network function.

8. A method as claimed in claim 1, wherein the VNFC instances are virtual machines.

9. Communications network management apparatus comprising a processor and a memory, the memory containing instructions executable by the processor, whereby the apparatus is operative to:
   receive a request to allocate an instance of a virtual network function component, VNFC, to a host, the instance belonging to an anti-affinity group, AAG, of instances, wherein the AAG indicates that the maximum number of instances allocable to a single host is a first number of instances, WA;
   attempt allocation of the instance to each host; and if allocation of the instance fails because for each host considered for allocation of the instance the first number of instances, WA, belonging to the AAG that are allocable to a single host would be exceeded by allocation of the instance to the host:
i. assign to the instance a second number of instances, WA', belonging to the AAG that are allocable to a single host, wherein WA' is greater than WA;
ii. reattempt allocation of the instance to each host; and
iii. following successful allocation, if sufficient capacity for the instance subsequently becomes available on another host and if the WA of the instance would not be exceeded by allocation of the instance to the other host, migrate the instance to the other host; or
iv. following unsuccessful allocation, if there is sufficient capacity for the instance available on at least one host, iteratively increase WA' of the instance and again reattempt allocation.

10. Communications network management apparatus as claimed in claim 9, wherein the VNFCs are N+M VNFCs, where N is a minimum number of instances of a VNFC required to be available and M is a number of redundancy instances of the VNFC and wherein the N+M instances belong to an AAG of instances.

11. Communications network management apparatus as claimed in claim 9, wherein the memory additionally contains instructions executable by the processor whereby the apparatus is additionally operative to:
store an identity of the instance and an indication of the WA of the instance following successful allocation; and
stop using WA' for the instance and return the instance to the stored WA after migration of the instance to the other host.

12. Communications network management apparatus as claimed in claim 9, wherein the apparatus is operative to receive a plurality of requests relating to a plurality of instances and the apparatus is configured to perform migration of the instance to the other host according to at least one of magnitude of anti-affinity violation, highest priority first, first-in-first-out and last-in-last-out, when sufficient capacity for at least one instance becomes available.

13. Communications network management apparatus as claimed in claim 11, wherein:
the apparatus is operative to receive a plurality of requests relating to a plurality of instances and the apparatus is configured to perform migration of the instance to the other host according to at least one of magnitude of anti-affinity violation, highest priority first, first-in-first-out and last-in-last-out, when sufficient capacity for at least one instance becomes available; and
the apparatus is additionally operative to store an indication of a current WA' of the instance and the magnitude of anti-affinity violation of the instance is a difference between WA and the current WA'.

14. Communications network management apparatus as claimed in claim 9, wherein the request is received in response to a host to which the instance is initially allocated becoming unavailable due to one of an unplanned event and a planned maintenance action.

15. Communications network management apparatus as claimed in claim 9, wherein the allocation is one of evacuation, migration, and allocation of a new instance during one of first deployment of a virtual network function and scale out of an existing virtual network function.

16. Communications network management apparatus as claimed in claim 9, wherein the VNFC instances are virtual machines.

17. A carrier containing a computer program, comprising instructions which, when executed on at least one processor, cause the at least one processor to carry out the method according to claim 1.

* * * * *